US010388248B2

(12) United States Patent
Choi

(10) Patent No.: US 10,388,248 B2
(45) Date of Patent: Aug. 20, 2019

(54) DISPLAY APPARATUS AND OPERATION METHOD THEREOF

(71) Applicant: SAMSUNG ELECTRONICS CO., LTD., Suwon-si, Gyeonggi-do (KR)

(72) Inventor: Jae-hyuk Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 294 days.

(21) Appl. No.: 15/216,782

(22) Filed: Jul. 22, 2016

(65) Prior Publication Data

US 2017/0024067 A1 Jan. 26, 2017

(30) Foreign Application Priority Data

Jul. 24, 2015 (KR) ........................ 10-2015-0105299

(51) Int. Cl.
| G09G 5/00 | (2006.01) |
| G06F 3/0346 | (2013.01) |
| G06F 3/01 | (2006.01) |
| H04N 5/44 | (2011.01) |
| H04N 21/422 | (2011.01) |
| H04N 21/443 | (2011.01) |
| G06F 1/3215 | (2019.01) |
| G06F 1/3234 | (2019.01) |
| G06F 3/038 | (2013.01) |

(52) U.S. Cl.
CPC ............. *G09G 5/003* (2013.01); *G06F 1/325* (2013.01); *G06F 1/3215* (2013.01); *G06F 3/017* (2013.01); *G06F 3/038* (2013.01); *G06F 3/0346* (2013.01); *H04N 5/4403* (2013.01); *H04N 21/42221* (2013.01); *H04N 21/42222* (2013.01); *H04N 21/4436* (2013.01); *H04N 2005/443* (2013.01); *H04N 2005/4428* (2013.01); *Y02D 50/20* (2018.01)

(58) Field of Classification Search
CPC ....... G09G 5/003; G06F 1/3215; G06F 1/325; G06F 3/017; G06F 3/041; G06F 3/0346; G06F 3/038; H04N 5/4403
See application file for complete search history.

(56) References Cited

U.S. PATENT DOCUMENTS

| 9,226,020 | B2 | 12/2015 | Kim et al. | |
| 2012/0154276 | A1* | 6/2012 | Shin | G06F 3/017 |
| | | | | 345/158 |
| 2013/0271404 | A1* | 10/2013 | Choi | G06F 3/01 |
| | | | | 345/173 |

FOREIGN PATENT DOCUMENTS

| JP | 2002-149345 | 5/2002 |
| JP | 2007-174220 | 7/2007 |
| KR | 10-0735182 | 6/2007 |
| KR | 10-1128704 | 3/2012 |

(Continued)

*Primary Examiner* — Michael A Faragalla
*Assistant Examiner* — Chayce R Bibbee
(74) *Attorney, Agent, or Firm* — Nixon & Vanderhye P.C.

(57) ABSTRACT

A display apparatus and a method of operating the same are provided. The display apparatus includes a display including a touch panel, a radio frequency (RF) module including RF circuitry configured to receive motion information of a control apparatus from the control apparatus, an infrared (IR) module including IR circuitry configured to receive a control signal from the control apparatus, and a controller configured to selectively activate the touch panel and the IR module based on the motion information.

18 Claims, 20 Drawing Sheets

(56) References Cited

FOREIGN PATENT DOCUMENTS

KR  10-2013-0010275  1/2013
KR  10-2014-0000928  1/2014

* cited by examiner

FIG. 10
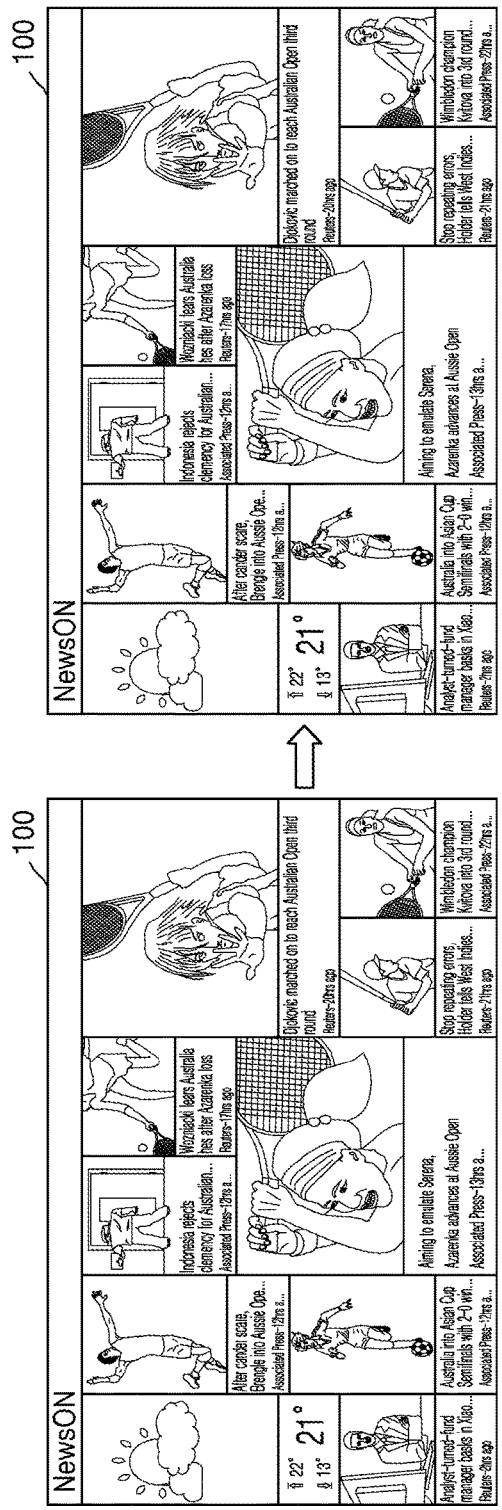
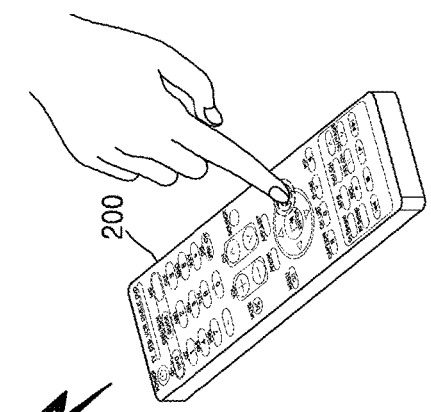

FIG. 14
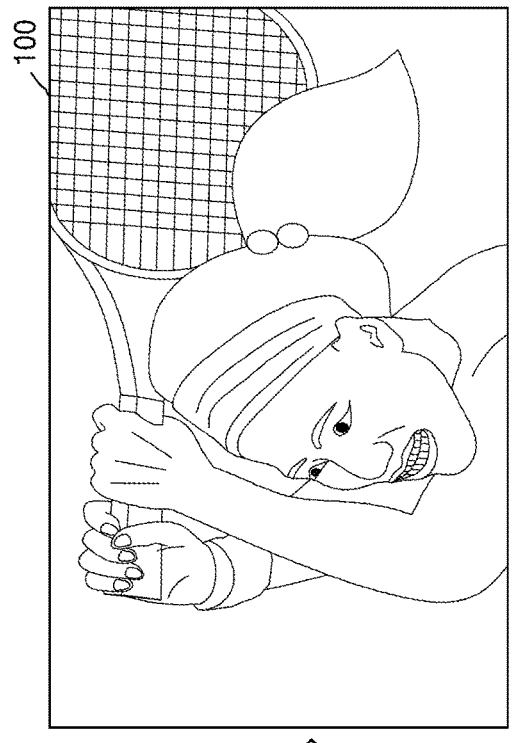
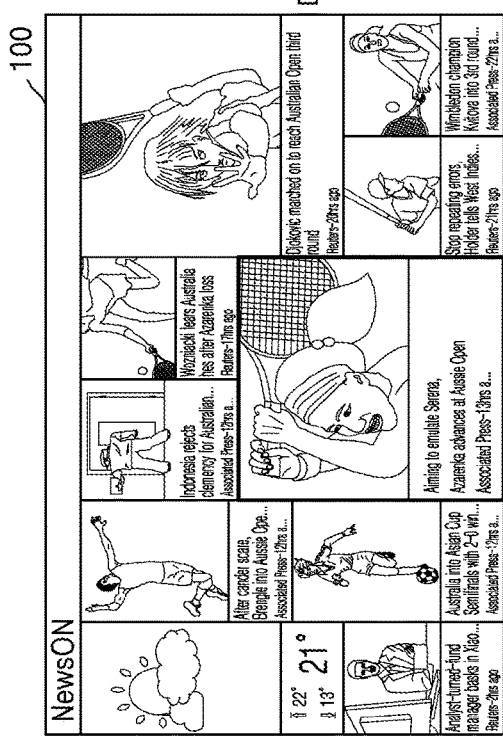
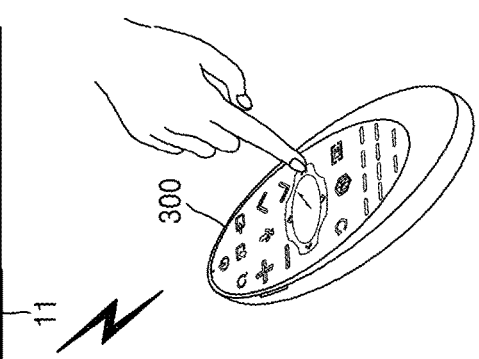

DISPLAY APPARATUS AND OPERATION METHOD THEREOF

CROSS-REFERENCE TO RELATED APPLICATION

This application is based on and claims priority under 35 U.S.C. § 119 to Korean Patent Application No. 10-2015-0105299, filed on Jul. 24, 2015, in the Korean Intellectual Property Office, the disclosure of which is incorporated by reference herein in its entirety.

BACKGROUND

1. Field

The present disclosure relates to display apparatuses and operation methods thereof, and for example, to display apparatuses and operation methods thereof, by which power consumption may be reduced.

2. Description of the Related Art

Display apparatuses have functions of displaying images for users to watch. For example, up until recently, a television (TV), which is an example of a display apparatus, unidirectionally received a broadcast signal broadcast by a broadcasting station and displayed a broadcast image. At present, however, a current-day TV provides a function of outputting various content as well as a broadcast image transmitted from a broadcasting station.

SUMMARY

A display apparatus and an operation method thereof are provided, by which power consumption may be reduced.

Additional aspects will be set forth in part in the description which follows and, in part, will be apparent from the description.

According to an aspect of an example embodiment, a display apparatus includes a display including a touch panel, a radio frequency (RF) module comprising radio frequency circuitry configured to receive motion information of a control apparatus from the control apparatus, an infrared (IR) module comprising infrared circuitry configured to receive a control signal from the control apparatus, and a controller configured to selectively activate the touch panel and the IR module based on the motion information.

The controller may be further configured to activate the IR module and to deactivate the touch panel, if a motion of the control apparatus is detected to be greater than a reference value based on the motion information.

The controller may be further configured to deactivate the IR module and to activate the touch panel, if no motion of the control apparatus is detected to be greater than the reference value based on the motion information.

The controller may be further configured to deactivate the IR module and to activate the touch panel, if no motion of the control apparatus is detected to be greater than the reference value during a first time after a motion of the control apparatus is detected to be greater than the reference value.

The display apparatus may further include power supply, in which the controller is further configured to block power supplied from the power supply to the deactivated touch panel or IR module.

The controller may be further configured to switch the touch panel to a suspend mode, if the touch panel does not receive a touch input during a second time after the touch panel is activated.

The controller may be further configured to activate the touch panel, if the touch panel receives a touch input after the touch panel switches to the suspend mode.

The controller may be further configured to select whether or not an energy saving mode is set and to selectively activate the touch panel and the IR module based on motion information of the control apparatus if the energy saving mode is selected.

The control signal received by the IR module may include a power on/off command, and the RF module is further configured to receive a second control signal, which is a control signal other than the power on/off command, from the control apparatus.

The controller may be further configured to control the display based on at least one of the power on/off command received by the IR module and the second control signal received by the RF module if the controller activates the IR module and deactivates the touch panel.

The controller may be further configured to control the display based on at least one of a touch input received via the touch panel and the second control signal received by the RF module if the controller deactivates the IR module and activates the touch panel.

According to an aspect of another example embodiment, a method of operating a display apparatus including a touch panel, a radio frequency (RF) module comprising RF circuitry, and an infrared (IR) module comprising IR circuitry includes receiving motion information of a control apparatus from the control apparatus through the RF module and selectively activating the touch panel and the IR module based on the motion information.

The selective activating of the touch panel and the IR module may include activating the IR module and deactivating the touch panel, if a motion of the control apparatus is detected to be greater than a reference value based on the motion information.

The selective activating of the touch panel and the IR module may include deactivating the IR module and activating the touch panel, if no motion of the control apparatus is detected to be greater than a reference value based on the motion information.

The selective activating of the touch panel and the IR module may include deactivating the IR module and activating the touch panel, if no motion of the control apparatus is detected to be greater than the reference value during a first time after a motion of the control apparatus is detected to be greater than the reference value.

The display apparatus may further include a power supply, and the method may further include blocking power supplied from the power supply to the deactivated touch panel or IR module.

The method may further include switching the touch panel to a suspend mode, if the touch panel does not receive a touch input during a second time after the touch panel is activated.

The method may further include activating the touch panel, if the touch panel receives a touch input after the touch panel switches to the suspend mode.

The method may further include selecting whether an energy saving mode is set and selectively activating the touch panel and the IR module based on the motion information if the energy saving mode is selected.

The method may further include controlling an operation of the display apparatus based on at least one of a power on/off command received by the IR module and a second control signal, which is a control signal other than the power on/off command, received by the RF module if activating the IR module and deactivating the touch panel, and controlling an operation of the display based on at least one of a touch input received via the touch panel and the second control signal received by the RF module if deactivating the IR module and activating the touch panel.

According to an aspect of another example embodiment, a non-transitory computer-readable recording medium having recorded thereon a program for implementing of the method of operating a display apparatus including a touch panel, an RF module, and an IR module.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 10 is a diagram illustrating an example case where an operation of a display apparatus in a touch mode is not controlled by a control apparatus;

FIG. 14 is a diagram illustrating an example case where an operation of a display apparatus in a touch mode is controlled by a control signal sent by an RF module of a control apparatus;

DETAILED DESCRIPTION

Figure 1:
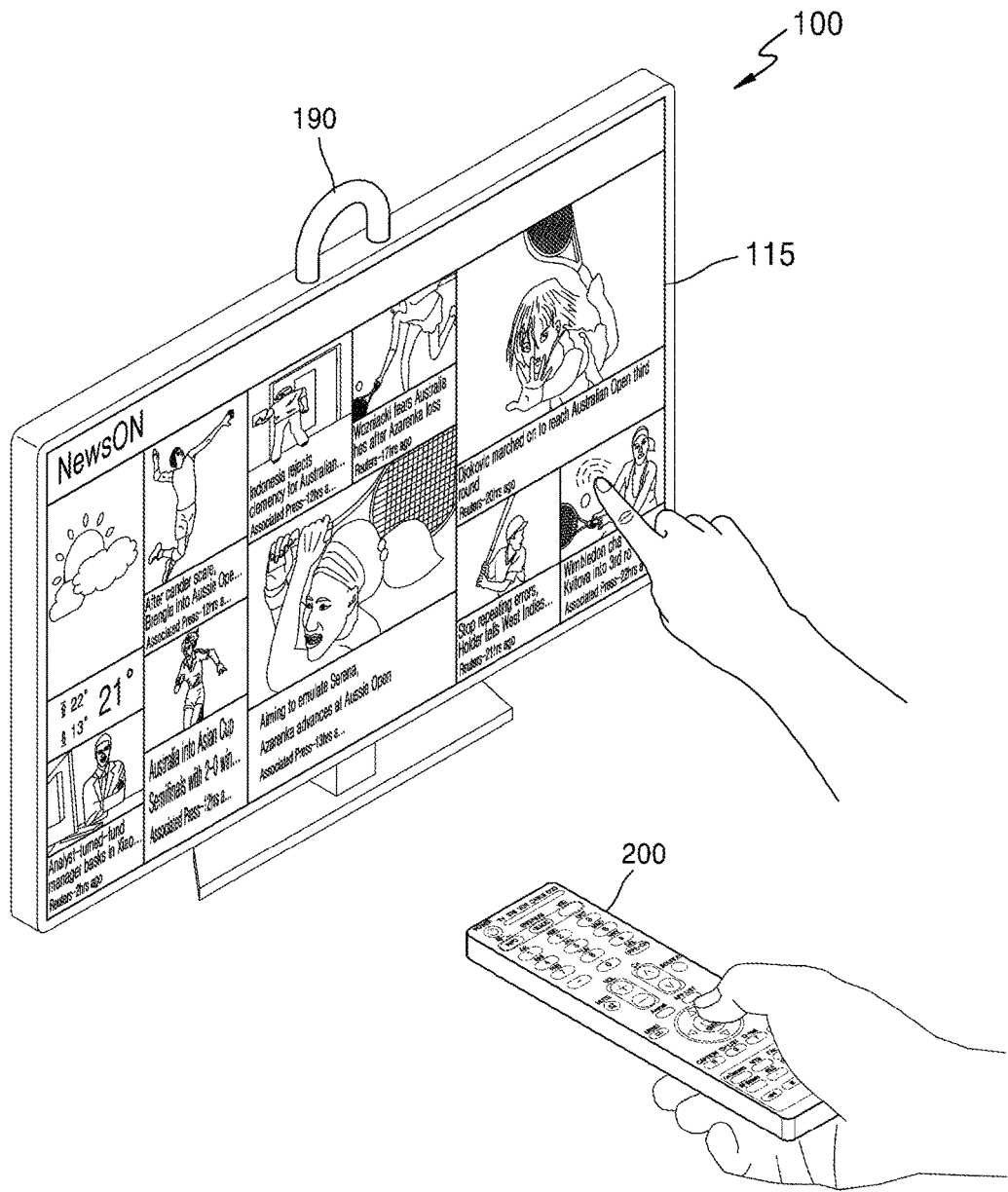
FIG. 1 is a reference diagram illustrating an example display apparatus according to some example embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

Advantages and features of the present disclosure and a method for achieving them will be apparent with reference to embodiments described below together with the attached drawings. However, the present disclosure is not limited to the disclosed embodiments, but may be implemented in various manners, and the embodiments are provided to complete the disclosure of the present disclosure and to allow those of ordinary skill in the art to understand the scope of the present disclosure. The present disclosure is defined by the category of the claims.

Although terms used in the present disclosure are selected with general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the present disclosure should be defined not by the simple names of the terms but by the meaning of the terms and the contents throughout the present disclosure.

FIG. 1 is a diagram illustrating an example display apparatus according to some example embodiments.

Referring to FIG. 1, a display apparatus 100 may include a display including a touch panel 115. The display apparatus 100 may further include a grip 190. The user moves the display apparatus 100 by using the grip 190.

The display apparatus 100 senses a user's touch through the touch panel 115. The display apparatus 100 controls an operation of the display apparatus 100 based on the sensed touch. The display apparatus 100 may be controlled remotely by a control apparatus 200.

Through the control apparatus 200 or the touch panel 115, the display apparatus 100 may be controlled variously, such as being powered on or off, changing a channel, adjusting a volume, selecting a type of broadcasting such as terrestrial broadcasting/cable broadcasting/satellite broadcasting, or the like, or setting an environment of the display apparatus 100.

As illustrated in FIG. 1, the display apparatus 100 displays contents on a screen and selects one of a plurality of contents through the control apparatus 200 or the touch panel 115. The display apparatus 100 outputs the selected content on the entire screen.

The control apparatus 200 illustrated in FIG. 1 may be, but not limited to, a TV remote controller, a pointer, a mouse, a motion recognizer, or the like. The control apparatus 200 illustrated in FIG. 1 is merely an example, and may be any type of a control apparatus if the control apparatus is capable of controlling the display apparatus 100.

The display apparatus 100 illustrated in FIG. 1 is merely an example, and may be any type of a display apparatus if the display apparatus is controllable by the control apparatus 200 or the touch panel 115, and may be indicated by any term such as a computing device, an electronic device, or the like.

The display apparatus 100 according to some example embodiments may operate to be controlled by one of the control apparatus 200 and the touch panel 115. Hereinafter, a detailed description will be provided.

Figure 2:
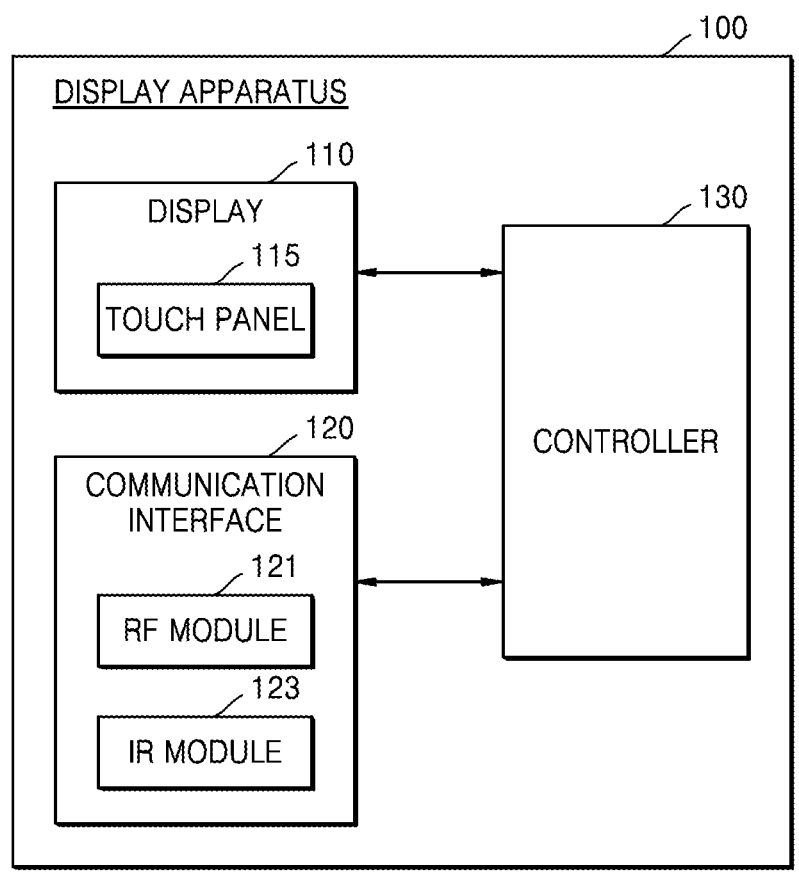
FIG. 2 is a block diagram illustrating an example display apparatus according to some example embodiments.

FIG. 2 is a block diagram illustrating an example display apparatus according to some example embodiments.

Referring to FIG. 2, the display apparatus 100 may include the display 110, a communication interface (e.g., including communication circuitry) 120, and a controller 130. The display 110 may include a touch panel 115, and the communication interface 120 may include a radio frequency (RF) module (e.g., including radio frequency circuitry) 121 and an infrared (IR) module (e.g., including infrared circuitry) 123.

The display 110 may be implemented with various types of displays, such as a liquid crystal display (LCD), an organic light emitting diode (OLED) display, an active-matrix OLED (AM-OLED), a plasma display panel (PDP), and so forth.

The display 110 may be coupled to the touch panel 115 so as to be provided as a touch screen. For example, the touch screen may include an integral type module in which the display panel and the touch panel 115 are coupled in a stacked structure.

The communication interface 120 may be configured to communicate with the control apparatus 200 of FIG. 1 or an external device. The communication interface 120 may include various communication circuitry, such as, for example, the RF module 121 including circuitry capable of transmitting and receiving a signal according to RF communication standards and the IR module 123 including circuitry capable of transmitting and receiving a signal according to IR communication standards. The RF module 121 may use, but not limited to, various communication circuitry implementing a communication scheme such as a wireless local area network (WLAN), Wireless Fidelity (Wi-Fi), Bluetooth, ZigBee, Wi-Fi Direct (WFD), ultra wideband (UWB), Bluetooth low energy (BLE), near field communication (NFC), or the like.

The controller 130 controls an overall operation of the display apparatus 100, and processes various data necessary for an operation of the display apparatus 100.

The RF module 121 receives motion information of the control apparatus 200 from the control apparatus 200. The RF module 121 is activated regardless of whether the IR module 123 is activated. Thus, even if the IR module 123 is deactivated, the RF module 121 may receive motion information of the control apparatus 200.

The IR module 123 is configured to receive a control signal sent from the control apparatus 200.

Any control signal sent by the control apparatus 200 may be received through the IR module 123. For example, the control apparatus 200 may be implemented with an IR remote controller. In this case, the RF module 121 may not receive a control signal other than the motion information of the control apparatus 200.

The RF module 121 may be configured to further receive a control signal in addition to motion information. The display apparatus 100 receives some control signals sent by the control apparatus 200 through the IR module 123 and other control signals through the RF module 121. Hereinbelow, the control signal received through the RF module 121 will be referred to as a "second control signal" to be distinguished from the control signal received through the IR module 123.

For example, the display apparatus 100 receives a power on/off command sent from the control apparatus 200 through the IR module 123 and second control signals, which are other control signals, through the RF module 121. For example, in the case of the control apparatus 200 implemented with a BT remote controller, the display apparatus 100 receives a power on/off command from the control apparatus 200 through the IR module 123 and second control signals, which are control signals other than the power on/off command, through the RF module 121. The display apparatus 100 receives a second control signal through the RF module 121 in a BT manner.

The controller 130 selectively activates the touch panel 115 and the IR module 123 based on motion information. The display apparatus 100 activates the touch panel 115 and deactivates the IR module 123. Alternatively, the display apparatus 100 deactivates the touch panel 115 and activates the IR module 123.

Once the touch panel 115 is activated, the display apparatus 100 controls an operation of the display apparatus 100 based on a touch sensed through the touch panel 115. Since the IR module 123 of the display apparatus 100 is deactivated, the display apparatus 100 may not receive a control signal sent by the control apparatus 200 according to the IR communication standards. Thus, even if the control apparatus 200 sends a control signal according to the IR communication standards, the display apparatus 100 may not be controlled by the control signal.

However, even if the IR module 123 is deactivated, the display apparatus 100 may receive a second control signal sent by the control apparatus 200 according to the RF communication standards. Thus, the operation of the display apparatus 100 may be controlled based on the second control signal sent by the control apparatus 200 according to the RF communication standards. That is, once the touch panel 115 is activated and the IR module 123 is deactivated, the display apparatus 100 may control the operation of the display apparatus 100 based on at least one of a touch input received through the touch panel 115 and a second control signal received through the RF module 121.

Once the IR module 123 is activated, the display apparatus 100 controls the operation of the display apparatus 100 based on a control signal of the control apparatus 200 received through the IR module 123. Since the touch panel 115 is deactivated, the display apparatus 100 may not sense a touch even if the user touches the touch panel 115. Thus, even when the user touches the touch panel 115, the display apparatus 100 may not be controlled by the touch.

The display apparatus 100 may receive motion information from the control apparatus 200 through the RF module 121. Thus, even when the display apparatus 100 deactivates the IR module 123, the display apparatus 100 may activate the IR module 123 based on the motion information received through the RF module 121. For example, when the IR module 123 is deactivated, if the user moves the control apparatus 200, the display apparatus 100 may receive motion information of the control apparatus 200 through the RF module 121 and activate the IR module 123 based on the motion information.

As the touch panel 115 and the IR module 123 of the display apparatus 100 are selectively activated based on the motion information of the control apparatus 200, power consumed by the display apparatus 100 may be saved.

Figure 3:
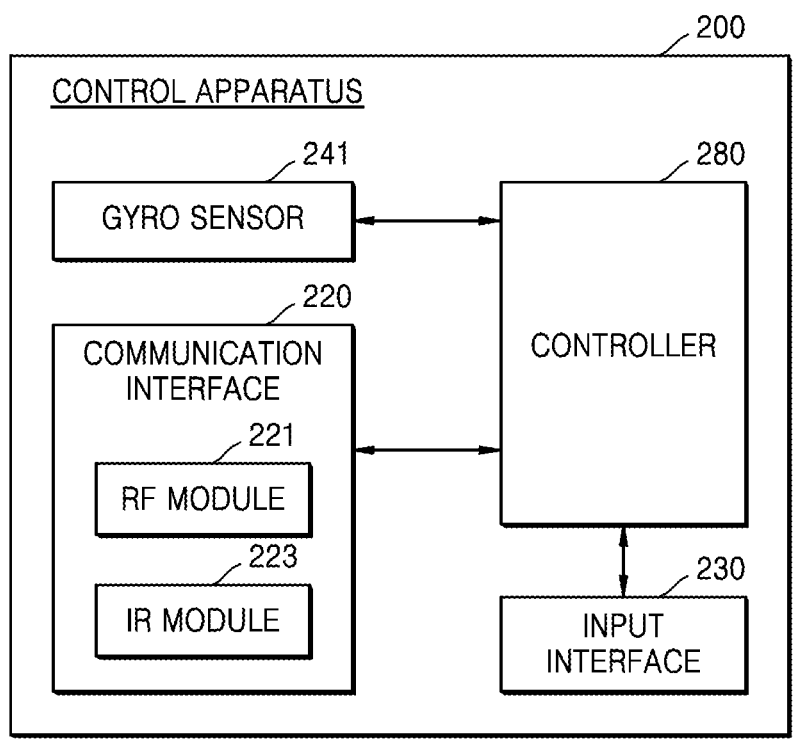
FIG. 3 is a block diagram illustrating an example control apparatus according to some example embodiments.

FIG. 3 is a block diagram illustrating an example control apparatus according to some example embodiments.

Referring to FIG. 3, the control apparatus 200 may include a gyro sensor 241, a communication interface (e.g., including communication circuitry) 220, an input interface (e.g., including input circuitry) 230, and a controller 280. The communication interface 220 may include an RF module 221 and an IR module 223.

The gyro sensor 241 senses motion information of the control apparatus 200. For example, the gyro sensor 241 may sense information about an operation of the control apparatus 200 based on x, y, and z axes.

The communication interface 220 includes communication circuitry that transmits a signal to and receives a signal from the above-described display apparatus 100. The communication interface 220 may include the RF module 221 including circuitry capable of transmitting and receiving a signal according to the RF communication standards. The communication interface 200 may include the IR module 223 including circuitry capable of transmitting and receiving a signal according to the IR communication standards.

The RF module 221 may use, but not limited to, various communication circuitry to implement a communication scheme such as a WLAN, Wi-Fi, Bluetooth, ZigBee, WFD, UWB, BLE, NFC, or the like.

The input interface 230 may include various input circuitry, such as, for example, and without limitation, a keypad, buttons, a touch pad, or a touch screen. The user inputs a command related to the display apparatus 100 to the control apparatus 200 by manipulating the input interface 230. If the input interface 230 includes a hard key button, the user inputs a command related to the display apparatus 100 to the control apparatus 200 by pushing the hard key button. If the input interface 230 includes a touch screen, the user inputs a command related to the display apparatus 100 to the control apparatus 200 by touching a soft key of the touch screen.

The controller 280 controls overall matters related to control of the control apparatus 200.

The controller 280 causes the RF module 221 to transmit motion information of the control apparatus 200 sensed by the gyro sensor 241 to the display apparatus 100 by controlling the gryo sensor 241 and the RF module 221.

If the command related to the display apparatus 100 is input through the user input interface 230, the controller 280 controls the communication interface 220 to cause the communication interface 220 to send a control signal corresponding to the command to the display apparatus 100.

Any control signal sent by the control apparatus 200 may be sent through the IR module 223. For example, the control apparatus 200 may be implemented with an IR remote controller. In this case, the RF module 221 may not send a control signal other than the motion information of the control apparatus 200.

The RF module 221 may be configured to further send a control signal in addition to motion information. The control apparatus 200 sends some control signals to the display apparatus 100 through the IR module 223 and other control signals to the display apparatus 100 through the RF module 221. A control signal sent through the RF module 221 may be referred to as a second control signal.

For example, the control apparatus 200 may send a power on/off command to the display apparatus 100 through the IR module 223 and second control signals, which are other control signals, to the display apparatus 100 through the RF module 221. For example, in the case of the control apparatus 200 implemented with a BT remote controller, the control apparatus 200 may send a power on/off command to the display apparatus 100 through the IR module 223 and second control signals, which are control signals other than the power on/off command, through the RF module 221. The RF module 221 may send the second control signal in a BT manner.

Figure 4:
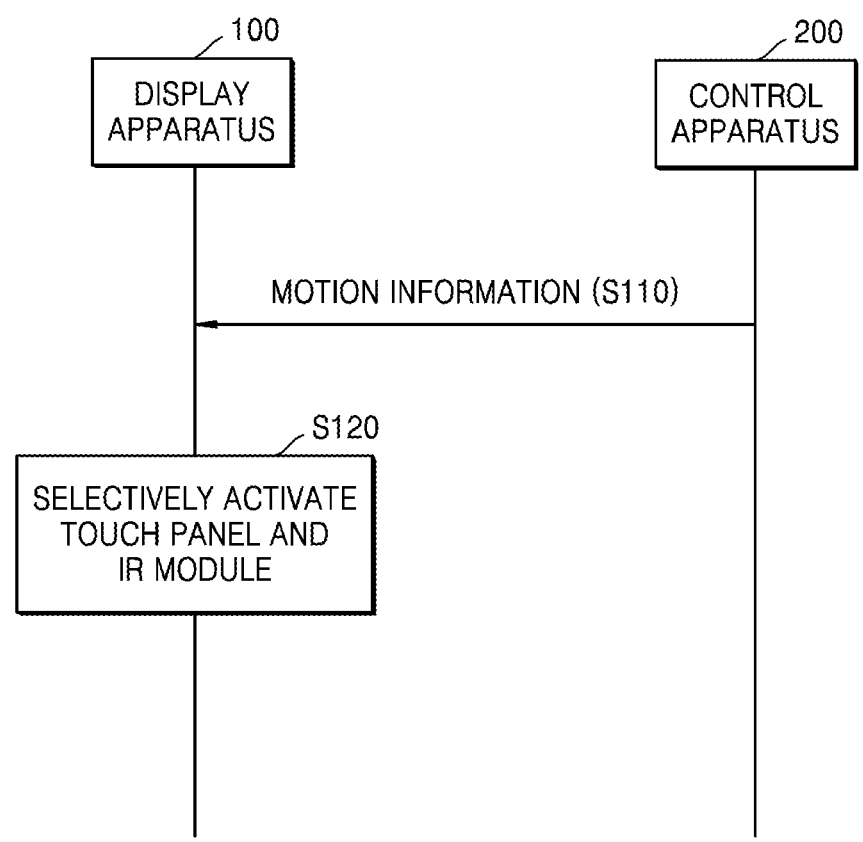
FIG. 4 is a flowchart illustrating an example operation method of a display apparatus and an operation method of a control apparatus according to some example embodiments.

FIG. 4 is a flowchart illustrating an example operation method of a display apparatus and an operation method of a control apparatus according to some example embodiments.

Referring to FIG. 4, the display apparatus 100 receives motion information of the control apparatus 200 from the control apparatus 200 in operation S110. The display apparatus 100 may include a touch panel and an IR module. The display apparatus 100 selectively activates the touch panel and the IR module 123 based on the motion information of the control apparatus 200 in operation S120.

Operation methods of the display apparatus 100 and the control apparatus 200 illustrated in FIG. 4 may be performed by the display apparatus 100 and the control apparatus 200 shown in the above-described drawings. The foregoing description is applicable to the operation methods of the display apparatus 100 and the control apparatus 200 illustrated in FIG. 4, and thus a repeated description will be omitted.

Figure 5:
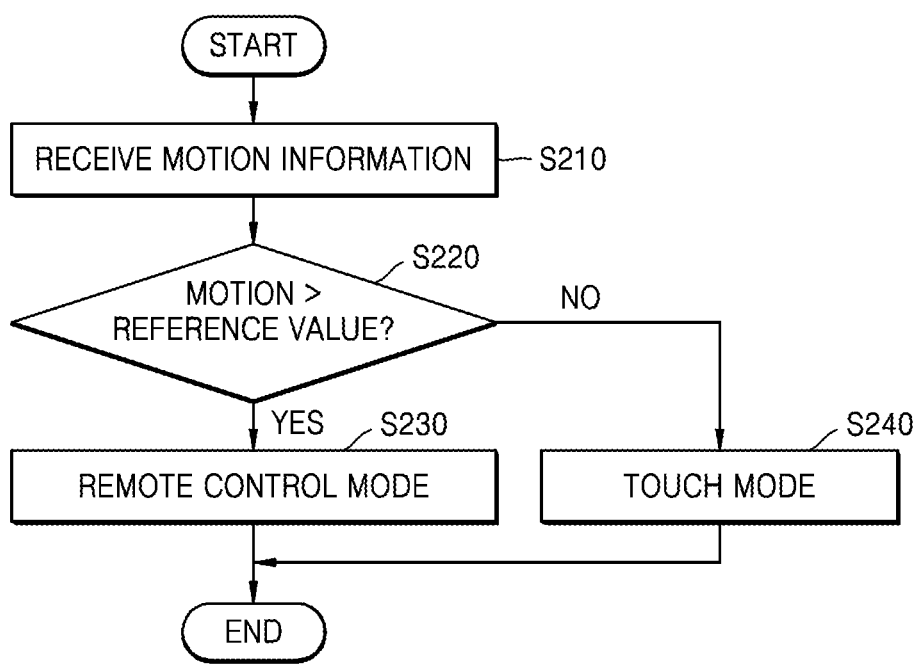
FIG. 5 is a flowchart illustrating an example operation method of a display apparatus according to some example embodiments.

FIG. 5 is a flowchart illustrating an example operation method of a display apparatus according to some example embodiments.

Referring to FIG. 5, the display apparatus receives motion information of the control apparatus from the control apparatus in operation S210.

The display apparatus determines based on the motion information whether a motion of the control apparatus is greater than a reference value in operation S220. The reference value may be a minimum value of a motion that may be estimated by a user using the control apparatus. The reference value may be set by experimental data.

If determining that the motion of the control apparatus is greater than the reference value, the display apparatus operates in a remote control mode in operation S230. The display apparatus activates an IR module and deactivates a touch panel.

If determining that the motion of the control apparatus is less than or equal to the reference value, the display apparatus operates in a touch mode in operation S240. The display apparatus deactivates the IR module and activates the touch panel.

The operation method of the display apparatus illustrated in FIG. 5 may be repeated whenever the display apparatus receives the motion information of the control apparatus.

The operation method of the display apparatus illustrated in FIG. 5 may be performed by the display apparatus 100 shown in the above-described drawings. The foregoing description is applicable to the operation method of the display apparatus 100 illustrated in FIG. 5, and thus a repeated description will be omitted.

When the user controls the display apparatus using the control apparatus, the control apparatus may move by the user's action of holding up the control apparatus. That is, if the motion of the control apparatus is greater than the reference value, it may be estimated that the user desires to use the control apparatus. In addition, when the user uses the control apparatus, it may be estimated that the user may not use the touch panel. Thus, if determining that the motion of the control apparatus is greater than the reference value, the display apparatus operates in the remote control mode to activate the IR module and to deactivate the touch panel.

On the other hand, if the user does not desire to use the control apparatus, the user may not touch the control apparatus, such that the control apparatus may not move. That is, if the motion of the control apparatus is less than or equal to than the reference value, it may be estimated that the user may not use the control apparatus. Instead, it may be estimated that the user may control the display apparatus using the touch panel. Thus, if determining that the motion of the control apparatus is less than or equal to than the reference value, the display apparatus operates in the touch mode to deactivate the IR module and to activate the touch panel.

In this way, the display apparatus may reliably estimate based on the motion information of the control apparatus whether the user desires to use the touch panel or the control apparatus. Thus, the display apparatus may not cause inconvenience in the user's operation of controlling the display apparatus and may reduce power consumption by selectively activating the touch panel and the IR module.

Figure 6:
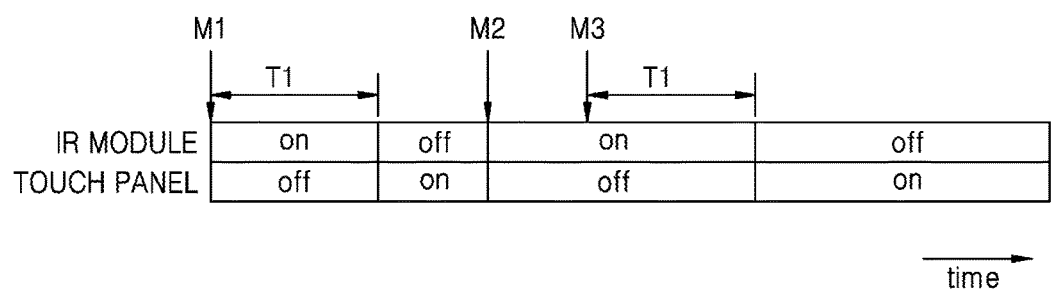
FIG. 6 is a diagram illustrating an example in which a display apparatus according to some example embodiments selectively activates an infrared (IR) module and a touch panel over time according to some example embodiments.

FIG. 6 is a diagram illustrating an example in which a display apparatus according to some example embodiments selectively activates an IR module and a touch panel over time according to some example embodiments.

Referring to FIG. 6, the display apparatus detects a motion M1 of the control apparatus, which is greater than a reference value, based on motion information of the control apparatus. If detecting the motion M1 of the control apparatus being greater than the reference value, the display apparatus activates the IR module and deactivates the touch panel.

During a first time T1 after the detection of the motion M1 of the control apparatus being greater than the reference value, the display apparatus may not re-detect a motion of the control apparatus being greater than the reference value. If the first time T1 has elapsed without the re-detection, the display apparatus deactivates the IR module and activates the touch panel. The first time T1 is a time during which activation of the IR module lasts. The first time T1 may be preset to a time estimated to be sufficient for the user to manipulate the control apparatus after the user moves the control apparatus. The first time T1 may be set to a value that is reliable based on experimental data.

If detecting a motion M2 of the control apparatus being greater than the reference value after the deactivation of the IR module, the display apparatus activates the IR module and deactivates the touch panel. Within the first time T1 after the detection of the motion M2 of the control apparatus, a motion M3 of the control apparatus being greater than the reference value may be detected again. In this case, the first time T1 during the activation of the IR module lasts may start again.

If a motion of the control apparatus being greater than the reference value is not detected again during the first time T1 after the detection of the motion M3 of the control apparatus, the display apparatus deactivates the IR module and activates the touch panel.

FIG. 6 is an example for convenience of a description, and an example embodiment in which a display apparatus according to some example embodiments selectively activates an IR module and a touch panel over time is not limited to FIG. 6.

Hereinbelow, with reference to FIGS. 7 through 10, a description will be made of an example of operations of the display apparatus based on motion information of the control apparatus according to some example embodiments. FIGS. 7 through 10 are provided for convenience of a description, and operations of the display apparatus according to some example embodiments are not limited thereto.

Figure 7:
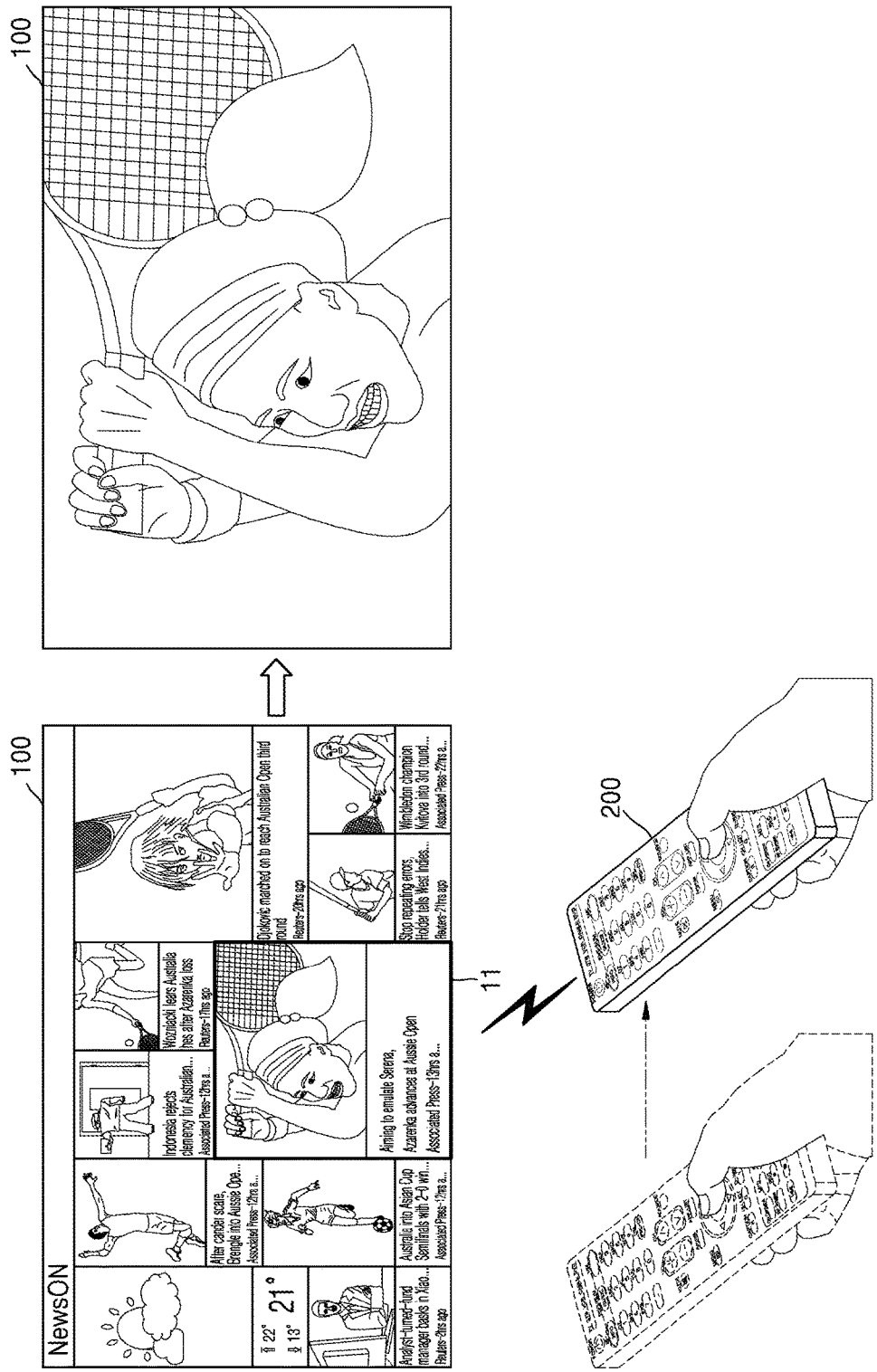
FIG. 7 is a diagram illustrating an example case where an operation of a display apparatus in a remote control mode is controlled by a control apparatus.

FIG. 7 is a diagram illustrating an example case where an operation of a display apparatus in a remote control mode is controlled by a control apparatus.

Referring to FIG. 7, the control apparatus 200 moves, and the display apparatus 100 receives motion information of the control apparatus 100. The display apparatus 100 activates an IR module and deactivates the touch panel, based on the motion information. That is, the display apparatus 100 operates in the remote control mode.

By the user's action of selecting a button of the control apparatus 200, the control apparatus 200 may send a control signal to the display apparatus 100. The display apparatus 100 receives the control signal and controls an operation of the display apparatus 100 based on the control signal.

As illustrated in FIG. 7, the display apparatus 100 displays a plurality of contents on a screen, and the user selects one content 11 from among the plurality of contents by using the control apparatus 200. The user may manipulate the control apparatus 200 in various manners like key manipulation, a touch, a gesture, and so forth with respect to the control apparatus 200, such that the control apparatus 200 selects the content 11.

The control apparatus 200 sends a control signal for selecting the content 11 to the display apparatus 100 which then outputs the content 11 selected based on the control signal.

Although the one content 11 is selected from among the plurality of contents by the control apparatus 200 in FIG. 7, FIG. 7 merely illustrates an example. Through the control apparatus 200, the display apparatus 100 may be controlled variously, such as being powered on or off, changing a channel, adjusting a volume, selecting a type of broadcasting such as terrestrial broadcasting/cable broadcasting/satellite broadcasting, or the like, or setting an environment of the display apparatus 100.

Figure 8:
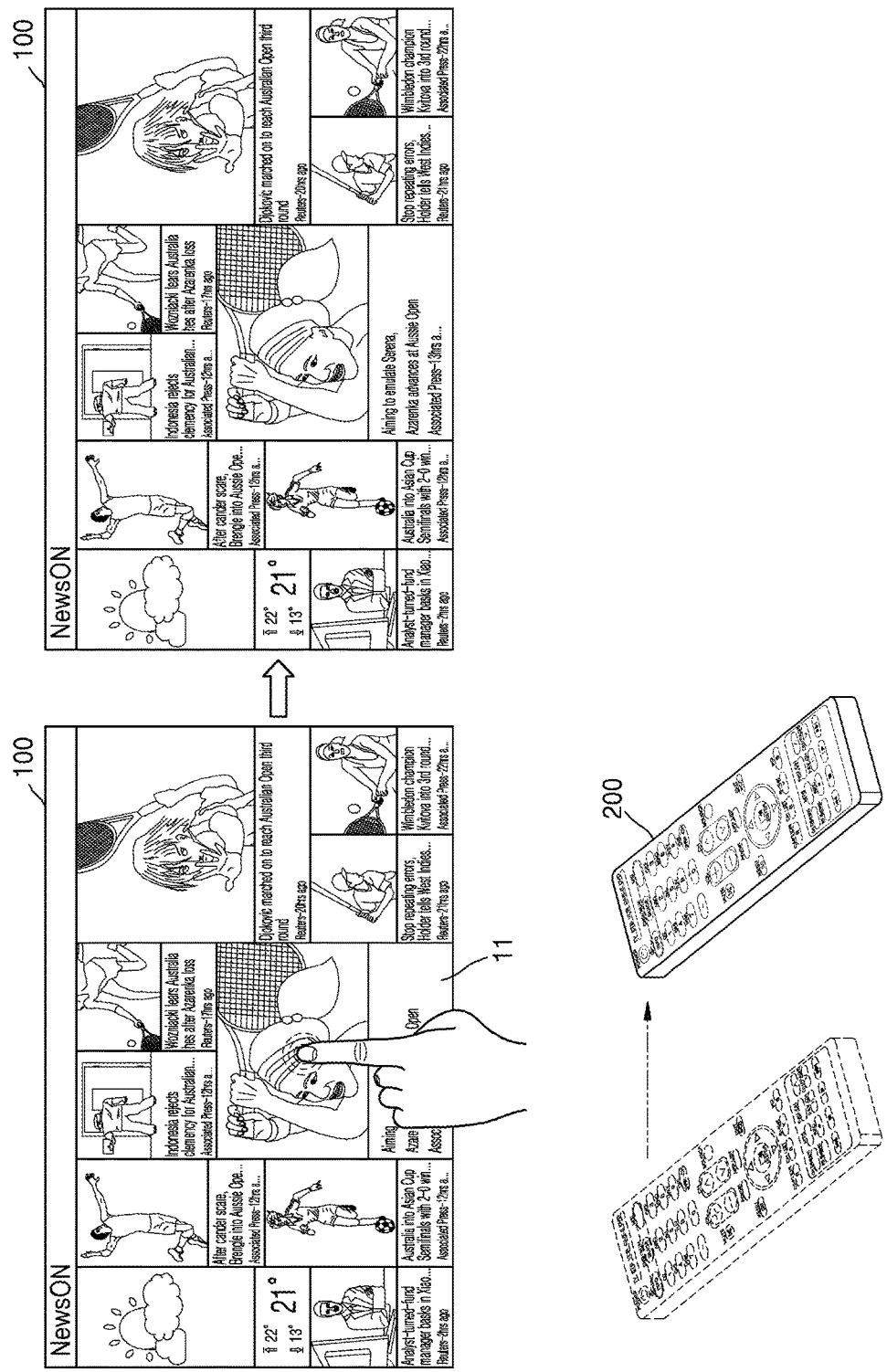
FIG. 8 is a diagram illustrating an example case where an operation of a display apparatus in a remote control mode is not controlled by a touch panel.

FIG. 8 is a diagram illustrating an example case where an operation of a display apparatus in a remote control mode is not controlled by a touch panel.

Referring to FIG. 8, the control apparatus 200 moves, and the display apparatus 100 receives motion information of the control apparatus 100. The display apparatus 100 activates an IR module and deactivates the touch panel, based on the motion information. That is, the display apparatus 100 operates in the remote control mode.

Since the touch panel has been deactivated, the display apparatus 100 is not controlled by a touch even if the user touches the display apparatus 100. That is, even if the user touches one of a plurality of contents displayed on the display apparatus 100, the display apparatus 100 may not either sense a touch or select the touched content.

Figure 9:
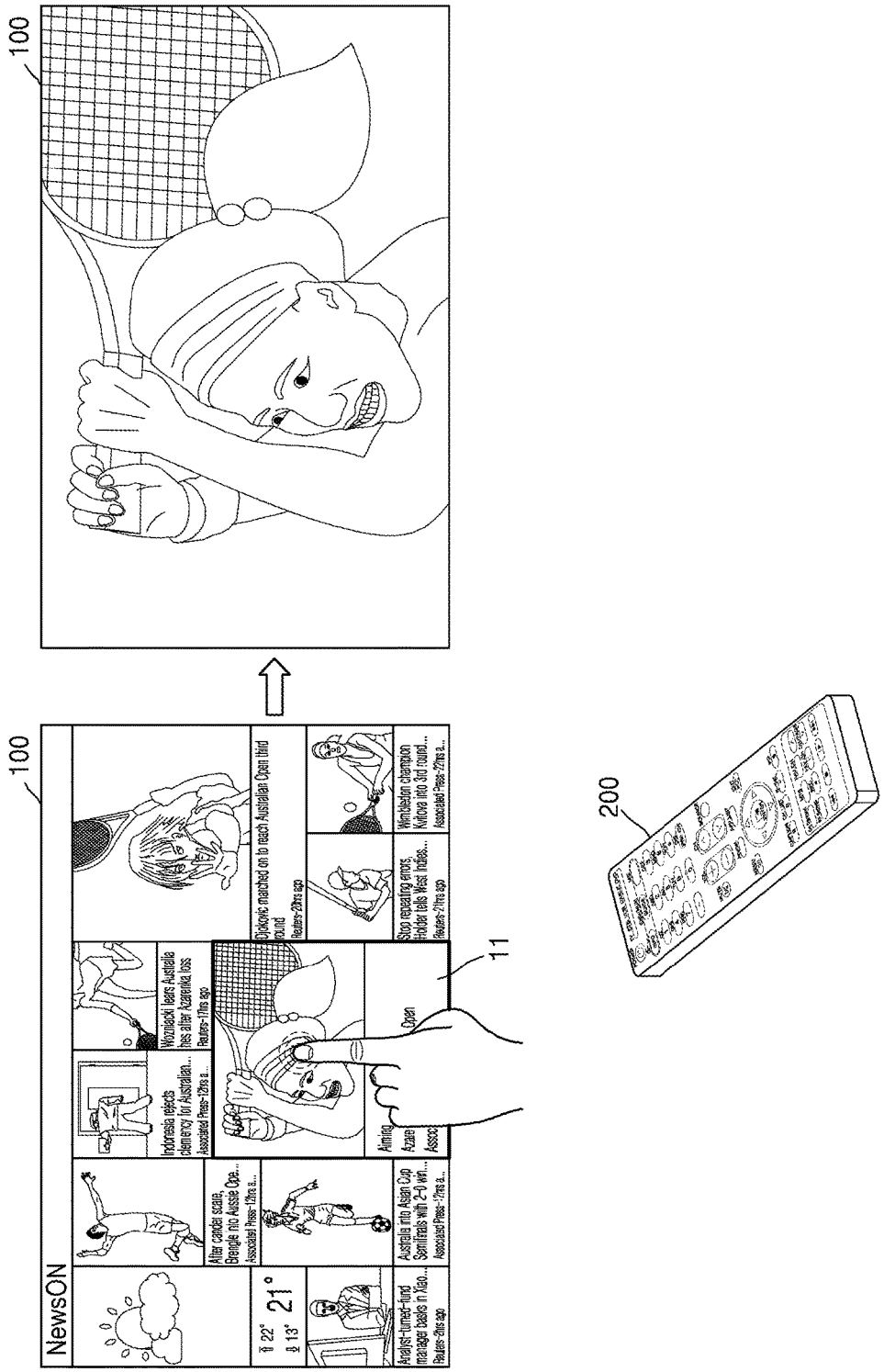
FIG. 9 is a diagram illustrating an example case where an operation of a display apparatus in a touch mode is controlled by a touch panel.

FIG. 9 is a diagram illustrating an example case where an operation of a display apparatus in a touch mode is controlled by a touch panel.

Referring to FIG. 9, the control apparatus 200 does not move. The display apparatus 100 does not detect a motion of the control apparatus 200, thus deactivating an IR module and activating the touch panel. That is, the display apparatus 100 operates in the touch mode.

The display apparatus 100 senses a touch of selecting one content 11 from among a plurality of contents through a touch panel. The display apparatus 100 outputs the selected content.

Although the one content 11 is selected from among the plurality of contents by the control apparatus 200 in FIG. 9, FIG. 9 merely shows an example. Through the touch panel, the display apparatus 100 may be controlled variously, such as being powered on or off, changing a channel, adjusting a volume, selecting a type of broadcasting such as terrestrial broadcasting/cable broadcasting/satellite broadcasting, or the like, or setting an environment of the display apparatus 100.

FIG. 10 is a diagram illustrating an example case where an operation of a display apparatus in a touch mode is not controlled by a control apparatus.

Referring to FIG. 10, the user may manipulate a button or a key of the control apparatus 200 without moving the control apparatus 200. The display apparatus 100 does not detect a motion of the control apparatus 200, thus deactivating an IR module and activating the touch panel. That is, the display apparatus 100 operates in the touch mode.

Since the IR module of the display apparatus 100 has been deactivated, the display apparatus 100 is not controlled by the control apparatus 200 even if the user manipulates a button or a key of the control apparatus 200 without moving the control apparatus 200. This is because, if the user manipulates a button or a key of the control apparatus 200 without moving the control apparatus 200, the display apparatus 100 fails to receive a control signal sent from the control apparatus 200.

The control apparatus 200 shown in FIGS. 7 through 10 may send a control signal for controlling the display apparatus 100 through the IR module. Thus, if the display apparatus 100 deactivates the IR module of the display apparatus 100, the display apparatus 100 is not controlled by the control apparatus 200. For example, the control apparatus 200 shown in FIGS. 7 through 10 may be implemented with an IR remote controller.

However, the control apparatus sends some control signals to the display apparatus through the IR module and other control signals to the display apparatus through the RF module. For example, the control apparatus may send a power on/off command to the display apparatus through the IR module and other control signals to the display apparatus through the RF module. For example, the control apparatus implemented with a BT remote controller may send a power on/off command to the display apparatus through the IR module and other control signals to the display apparatus through the RF module in a BT manner. In this case, if the display apparatus deactivates the IR module, the power on/off of the display apparatus may not be controlled by the control apparatus. However, if the control apparatus sends other control signals than the power on/off command through the RF module even when the display apparatus deactivates the IR module, the display apparatus may be controlled by the control apparatus.

Hereinbelow, with reference to FIGS. 11 through 14, a description will be made of an example of operations of the display apparatus based on motion information of the control apparatus according to some example embodiments. It is assumed that a control apparatus 300 illustrated in FIGS. 11 through 14 sends a power on/off command to the display apparatus 100 through the IR module and other signals through the RF module. FIGS. 11 through 14 are provided for convenience of a description, and operations of the display apparatus 100 according to some embodiments are not limited thereto.

Figure 11:
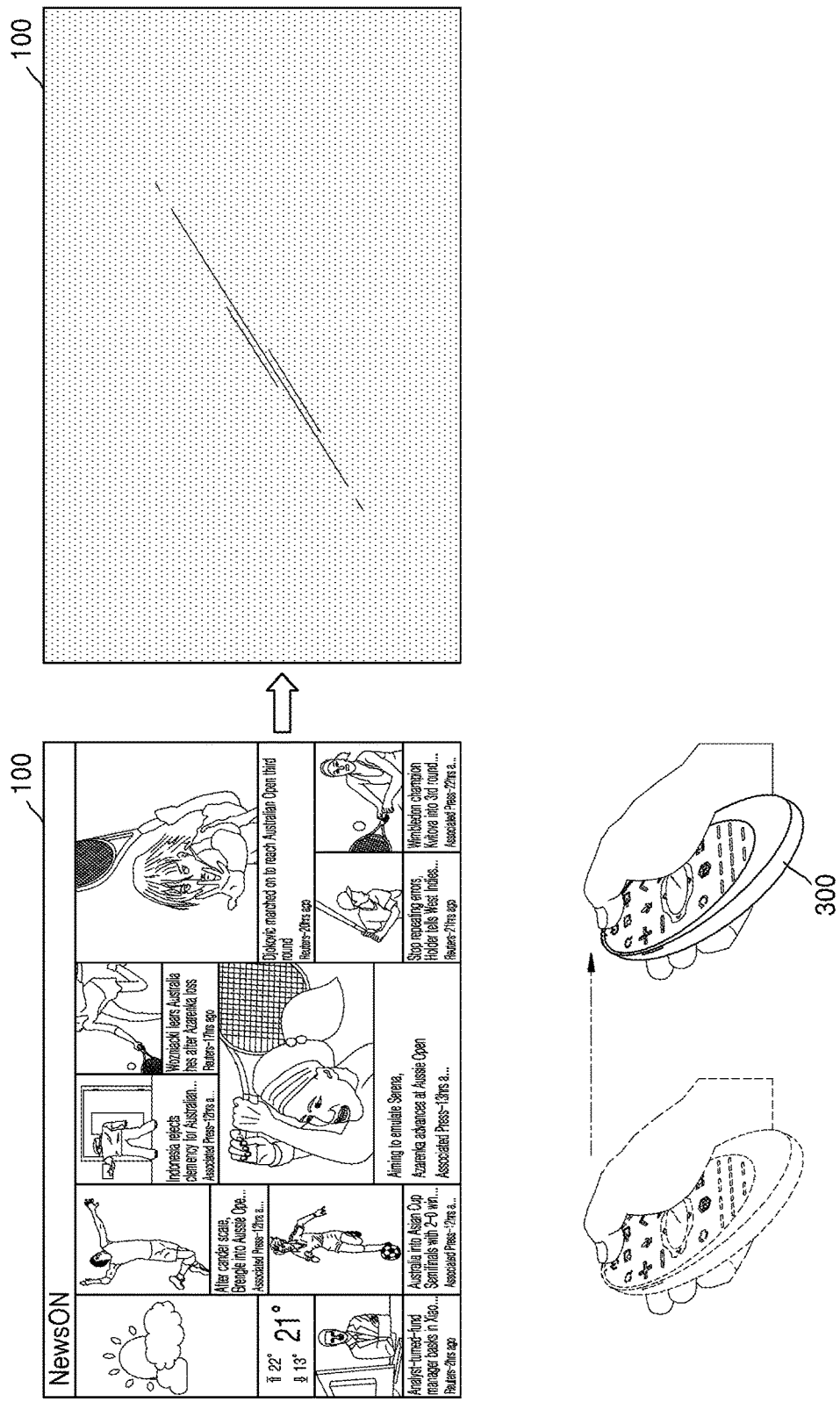
FIG. 11 is a diagram illustrating an example case where an operation of a display apparatus in a remote control mode is controlled by a power on/off command of a control apparatus.

FIG. 11 is a diagram illustrating an example case where an operation of a display apparatus in a remote control mode is controlled by a power on/off command of a control apparatus.

Referring to FIG. 11, the control apparatus 300 moves and the display apparatus 100 receives motion information of the control apparatus 300. The display apparatus 100 activates an IR module and deactivates the touch panel, based on the motion information. That is, the display apparatus 100 operates in the remote control mode.

The power on/off button of the control apparatus 300 is selected by the user, and the control apparatus 300 sends a control signal for instructing power on/off to the display apparatus 100. The display apparatus 100 receives a control signal for instructing power on/off through the IR module and powers off the display apparatus 100 based on the received control signal.

Figure 12:
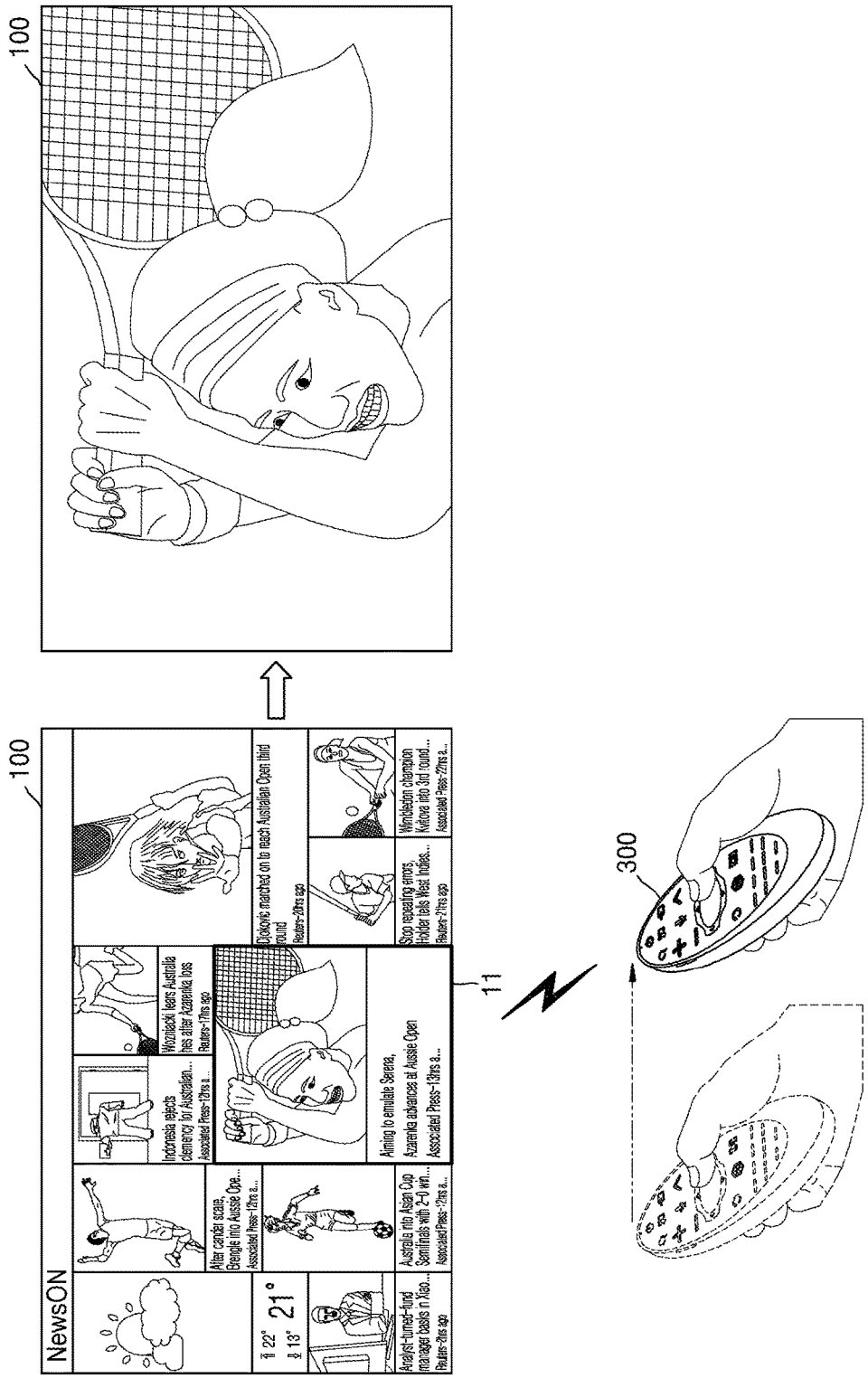
FIG. 12 is a diagram illustrating an example case where an operation of a display apparatus in a remote control mode is controlled by a control signal sent by a radio frequency (RF) module of a control apparatus.

FIG. 12 is a diagram illustrating an example case where an operation of a display apparatus in a remote control mode is controlled by a control signal sent by an RF module of a control apparatus.

Referring to FIG. 12, the control apparatus 300 moves and the display apparatus 100 receives motion information of the control apparatus 300 from the control apparatus 300. The display apparatus 100 activates an IR module and deactivates the touch panel, based on the motion information. That is, the display apparatus 100 operates in the remote control mode.

The RF module of the display apparatus 100 is also activated. The control apparatus 300 sends other control signals than the power on/off command through the RF module. The display apparatus 100 receives other control signals than the power on/off command through the RF module and controls the display apparatus 100 based on the received control signal.

Although the one content 11 is selected from among the plurality of contents by the control apparatus 300 in FIG. 12, FIG. 12 merely illustrates an example. Through the control apparatus 300, the display apparatus 100 may be controlled variously, such as being powered on or off, changing a channel, adjusting a volume, selecting a type of broadcasting such as terrestrial broadcasting/cable broadcasting/satellite broadcasting, or the like, or setting an environment of the display apparatus 100.

Since the touch panel of the display apparatus 100 has been deactivated in FIG. 12, there may be no change in the display apparatus 100 even if the user touches the screen of the display apparatus 100.

Figure 13:
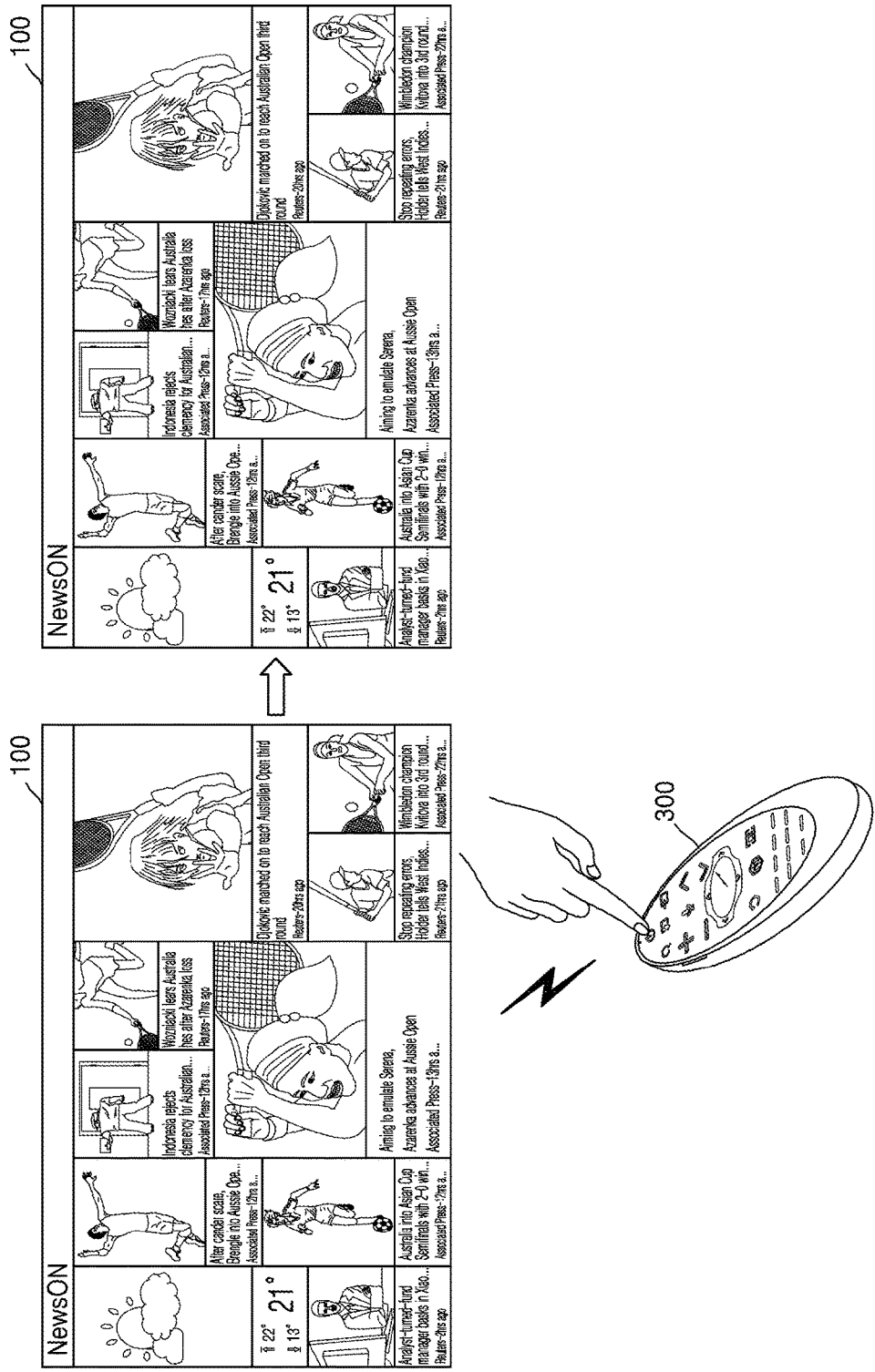
FIG. 13 is a diagram illustrating an example case where an operation of a display apparatus in a touch mode is not controlled by a power on/off command of a control apparatus.

FIG. 13 is a diagram illustrating an example case where an operation of a display apparatus in a touch mode is not controlled by a power on/off command of a control apparatus.

Referring to FIG. 13, the control apparatus 300 does not move. The display apparatus 100 does not detect a motion of the control apparatus 200, thus deactivating an IR module and activating the touch panel. That is, the display apparatus 100 operates in the touch mode.

The user may select a power on/off button of the control apparatus 300 without moving the control apparatus 300. Since the IR module of the display apparatus 100 has been deactivated, the display apparatus 100 may not receive a power on/off command even if the control apparatus 300 sends the power on/off command. Thus, the display apparatus 100 does not power on the display apparatus 100 even if the user selects the power on/off button of the control apparatus 300.

FIG. 14 is a diagram illustrating an example case where an operation of a display apparatus in a touch mode is controlled by a control signal sent by an RF module of a control apparatus.

Referring to FIG. 14, the control apparatus 300 does not move. The display apparatus 100 does not detect a motion of the control apparatus 300, thus deactivating the IR module and activating the touch panel. That is, the display apparatus 100 operates in the touch mode.

The user selects other buttons or keys than the power on/off button of the control apparatus 300 without moving the control apparatus 300, such that the control apparatus 300 sends other control signals than the power on/off command through the RF module. The IR module of the display apparatus 100 is deactivated, but the RF module of the display apparatus 100 is activated. Thus, the display apparatus 100 receives other control signals than the power on/off command through the RF module and controls the operation of the display apparatus 100 based on the received control signal.

Although the one content 11 is selected from among the plurality of contents by the control apparatus 300 in FIG. 14, FIG. 14 merely illustrates an example. Through the control apparatus 300, the display apparatus 100 may be controlled variously, such as being powered on or off, changing a channel, adjusting a volume, selecting a type of broadcasting such as terrestrial broadcasting/cable broadcasting/satellite broadcasting, or the like, or setting an environment of the display apparatus 100.

Since the touch panel of the display apparatus 100 has been activated in FIG. 14, the display apparatus 100 may control the operation of the display apparatus 100 based on a user's touch made through the touch panel.

As described above, the display apparatus 100 may reduce power consumption by selectively deactivating the touch panel and the IR module.

The display apparatus 100 according to some embodiments may activate the IR module regardless of whether the control apparatus 300 moves, if the display apparatus 100 is powered off.

Figure 15:
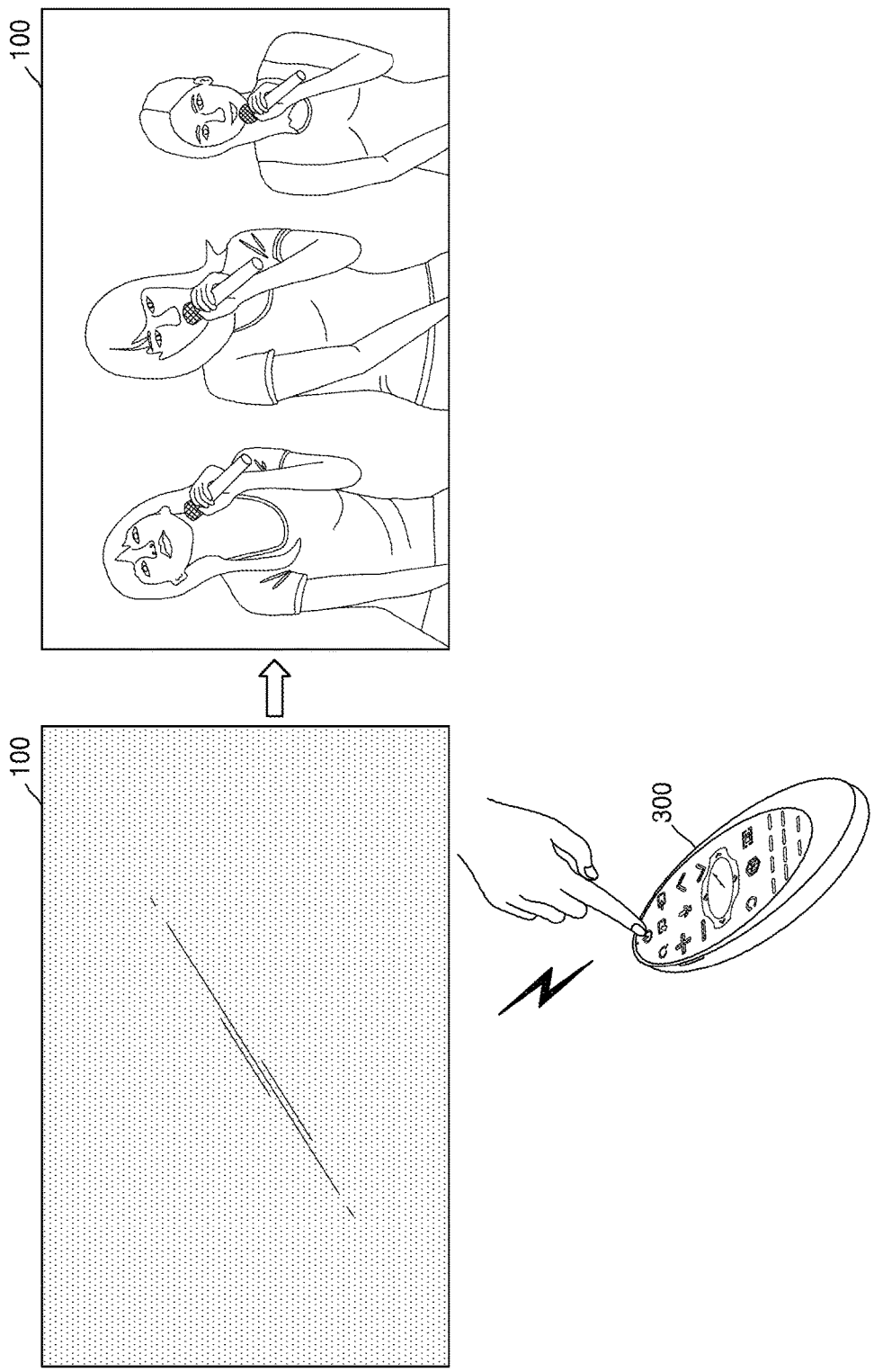
FIG. 15 is a diagram illustrating an example where a display apparatus is powered off.

FIG. 15 is a diagram illustrating an example where a display apparatus is powered off.

Referring to FIG. 15, the display apparatus 100 is in a power-off state. When the power of the display apparatus 100 is off, the display apparatus 100 may activate the IR module. When the power of the display apparatus 100 is off, the display apparatus 100 may deactivate the touch panel.

The control apparatus 300 sends a power on/off command through the IR module. The display apparatus 100 receives the power on/off command through the IR module and powers on the display apparatus 100 based on the received power on/off command.

If the power of the display apparatus 100 is off, the IR module has been activated, such that the display apparatus 100 may be powered on by the control apparatus 300 regardless of whether the control apparatus 300 moves.

Once the display apparatus 100 is powered on, the display apparatus 100 selectively activates the IR module and the touch panel based on the motion information of the control apparatus 300.

The display apparatus 100 according to some embodiments may operate the touch panel in a suspend mode. This will be described with reference to FIG. 16.

Figure 16:
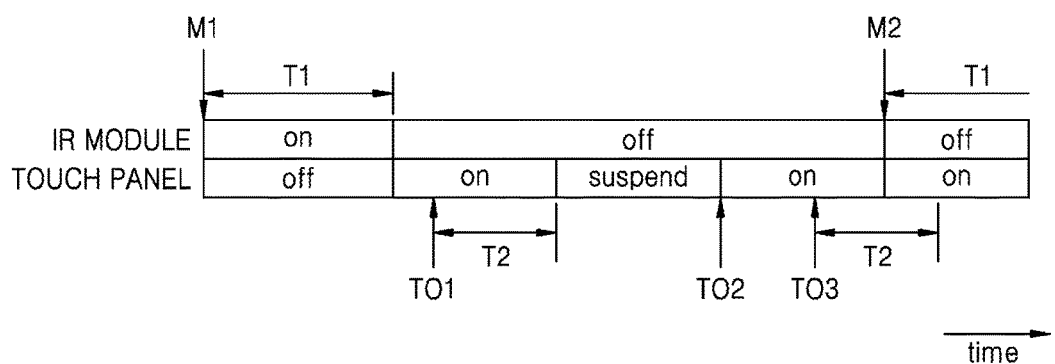
FIG. 16 is a diagram illustrating an example in which a display apparatus according to some example embodiments selectively activates an IR module and a touch panel over time according to some example embodiments.

FIG. 16 is a diagram illustrating an example in which a display apparatus according to some example embodiments selectively activates an IR module and a touch panel over time according to some example embodiments.

Referring to FIG. 16, the display apparatus detects a motion M1 of the control apparatus, which is greater than a reference value, based on motion information of the control apparatus. If detecting the motion M1 of the control apparatus being greater than the reference value, the display apparatus activates the IR module and deactivates the touch panel.

During the first time T1 after the detection of the motion M1 of the control apparatus being greater than the reference value, the display apparatus may not re-detect a motion of the control apparatus being greater than the reference value. If the first time T1 has elapsed without the re-detection, the display apparatus deactivates the IR module and activates the touch panel.

When the touch panel is in an active state, the display apparatus may receive a touch input TO1 through the touch panel. The display apparatus may be controlled based on the touch input TO1.

If the display apparatus does not receive another touch input during a second time T2 after the touch input TO1, the display apparatus switches the touch panel into the suspend mode. The suspend mode may be a mode in which the touch panel is partially deactivated such that the touch panel does not perform other operations than an operation of sensing a touch event that returns the touch panel to an active mode. That is, the suspend mode may be a mode in which a minimum power necessary for sensing the touch event is supplied to the touch panel. The power consumption of the touch panel may be reduced in order of the active mode, the suspend mode, and then an inactive mode.

The second time T2 is a time during which activation of the touch panel lasts. The second time T2 may be preset to a time estimated to be sufficient for the user to manipulate the display apparatus by touching the touch panel. The second time T2 may be set to a value that is reliable based on experimental data.

When the touch panel is in the suspend mode, the touch panel is activated again upon sensing a touch event, a touch TO2 thereon. The touch TO2 for returning the touch panel to the active mode may be a simple touch action such as a single tap or double taps. Another operation of the display apparatus may not be controlled by the touch TO2 in addition to switch of the touch panel from the suspend mode to the active mode by the touch TO2.

Once the touch panel is activated, the display apparatus may receive a touch input TO3 through the touch panel. The display apparatus may be controlled based on the touch input TO3.

If detecting the motion M2 of the control apparatus being greater than the reference value, the display apparatus activates the IR module and deactivates the touch panel.

After the user controls the display apparatus through the control apparatus or the touch panel, the display apparatus outputs content according to a control result. Thereafter, the user may view content output from the display apparatus without further using the control apparatus and the touch panel. Thus, if any motion of the control apparatus or any touch input to the touch panel is not sensed during the first time T1 or the second time T2 as illustrated in FIG. 16, the display apparatus deactivates the IR module and reduces power consumption by operating the touch panel in the suspend mode.

Figure 17:
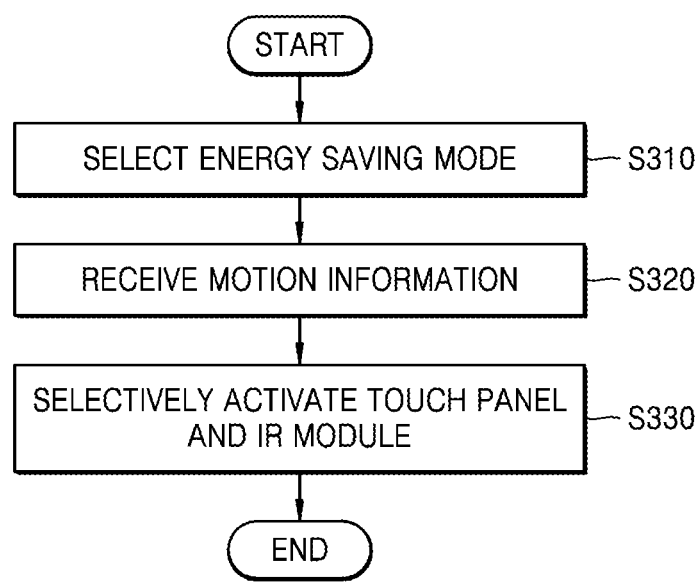
FIG. 17 is a flowchart illustrating an example operation method of a display apparatus according to some example embodiments.

FIG. 17 is a flowchart illustrating an example operation method of a display apparatus according to some example embodiments.

Referring to FIG. 17, the display apparatus selects an energy saving mode in operation S310. The display apparatus receives motion information of the control apparatus from the control apparatus in operation S320. The display apparatus selectively activates the touch panel and the IR module based on the motion information of the control apparatus in operation S330.

If the display apparatus does not select the energy saving mode, both the touch panel and the IR module of the display apparatus may operate in the active mode. The energy saving mode may be selected by the user. The display apparatus may select whether or not the energy saving mode is set. Alternatively, the energy saving mode may be set by default in the display apparatus and may be changed by the user. According to a user input input through the control apparatus or the touch panel, the display apparatus may select the energy saving mode.

If the display apparatus selects the energy saving mode, the display apparatus may selectively activate the touch panel and the IR module based on motion information of the control apparatus according to the foregoing description. Thus, a repeated description will be omitted.

Figure 18:
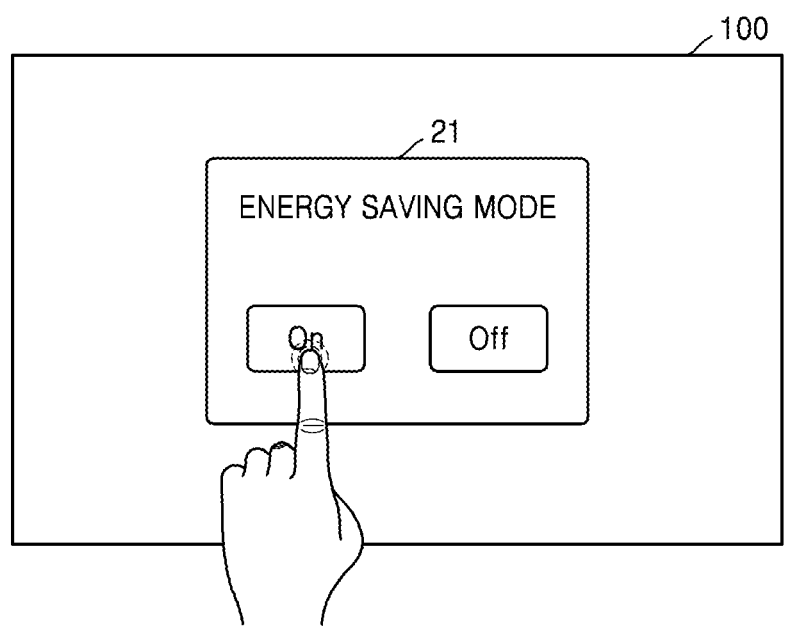
FIG. 18 is a diagram illustrating an example of a display apparatus that selects an energy saving mode according to some example embodiments.

FIG. 18 is a diagram illustrating an example of a display apparatus that selects an energy saving mode according to some example embodiments.

Referring to FIG. 18, the display apparatus 100 outputs a user interface (UI) 21 for selecting the energy saving mode on the screen. The display apparatus 100 receives a user input and selects or does not select the energy saving mode based on the received user input.

Although the display apparatus selects the energy saving mode through the touch panel in FIG. 18, the present disclosure is not limited thereto. The display apparatus may also select the energy saving mode through the control apparatus.

Figure 19:
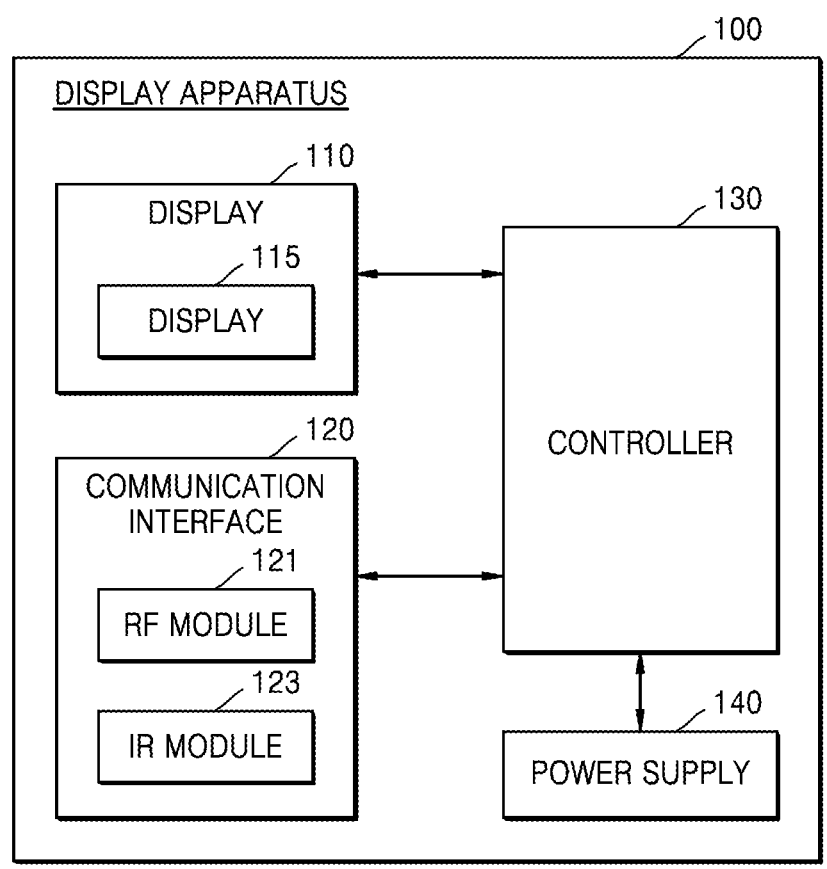
FIG. 19 is another block diagram illustrating the example display apparatus illustrated in FIG. 2.

FIG. 19 is another block diagram illustrating the example display apparatus illustrated in FIG. 2.

Referring to FIG. 19, the display apparatus 100 may include the display 110, the communication interface (e.g., including communication circuitry) 120, and the controller 130. The display 110 may include the touch panel 115, and the communication interface 120 may include the RF module (e.g., including RF circuitry) 121 and the IR module (e.g., including IR circuitry) 123. The display apparatus 100 may further include a power supplier 140.

The power supply 140 supplies power to the display apparatus 100. The power supply 140 may be charged through an external power supplier. The power supply 140 may be implemented with a battery.

The RF module 121 includes circuitry that receives motion information of the control apparatuses 200 and 300 from the control apparatuses 200 and 300.

The IR module 123 includes circuitry that is configured to receive control signals from the control apparatuses 200 and 300.

The IR module 123 is configured to receive any control signal from the control apparatuses 200 and 300. Alternatively, the IR module 123 is configured to receive some control signals sent from the control apparatuses 200 and 300. The IR module 121 is configured to receive other some control signals, second control signals, from the control apparatuses 200 and 300. The control signal received by the IR module 123 may include a power on/off command. The control signal received by the IR module 121 may include be a second control signal other than the power on/off command.

The controller 130 selectively activates the touch panel 115 and the IR module 123 based on motion information. The display apparatus 100 activates the touch panel 115 and deactivates the IR module 123. Alternatively, the display apparatus 100 deactivates the touch panel 115 and activates the IR module 123.

The controller 130 blocks power supplied from the power supplier 140 to the deactivated touch panel or IR module. By doing so, the power consumption of the display apparatus 100 may be reduced. In particular, when the display apparatus 100 uses power charged in the power supplier 140 without being connected with the external power supplier, reducing of the power consumption of the display apparatus 100 may be meaningful.

The display apparatus 100 may receive motion information from the control apparatuses 200 and 300 through the RF module 121 regardless of whether the IR module 123 of the display apparatus 100 is activated. Thus, even when the display apparatus 100 deactivates the IR module 123, the display apparatus 100 may activate the IR module 123 based on the motion information received through the RF module 121.

Even when the controller 130 deactivates the IR module 123, the display apparatus 100 may receive a second control signal, which is a control signal sent by the control apparatuses 200 and 300 according to the RF communication standards, through the RF module 121. Thus, the operation of the display apparatus 100 may be controlled based on the second control signal received through the RF module 121.

If detecting a motion of the control apparatuses 200 and 300 being greater than the reference value based on the motion information, the controller 130 activates the IR module 121 and deactivates the touch panel 115.

If detecting no motion of the control apparatuses 200 and 300 being greater than the reference value based on the motion information, the controller 130 deactivates the IR module 121 and activates the touch panel 115.

If detecting no motion of the control apparatuses 200 and 300 being greater than the reference value during the first time after the detection of the motion of the control apparatus being greater than the reference value, the controller 130 deactivates the IR module 121 and activates the touch panel 115.

If the touch panel 115 does not receive a touch input during the second time after the deactivation of the touch panel 115, the controller 130 switches the touch panel 115 to the suspend mode. If the touch panel 115 receives a touch input after switching to the suspend mode, the controller 130 activates the touch panel 115.

The controller 130 may select the energy saving mode. If the energy saving mode is selected, the controller 130 selectively activates the touch panel 115 and the IR module 123. If the energy saving mode is not selected, both the touch panel 115 and the IR module 123 may be activated.

Once the controller 130 activates the IR module 123 and deactivates the touch panel 115, the controller 130 controls the display 110 based on the control signal received from the control apparatus 130 through the IR module 123. Alternatively, the controller 130 controls the display 110 based on at least one of the power on/off command received through the IR module 123 and the second control signal received through the RF module 121.

Once the controller 130 deactivates the IR module 123 and activates the touch panel 115, the controller 130 controls the display 110 based on the touch input received through the touch panel 115. Alternatively, the controller 130 may control the display 110 based on at least one of a touch input received through the touch panel 115 and a second control signal received through the RF module 121.

The display apparatus 100 may further include another element not shown in FIG. 19. For example, the display apparatus 100 may further include a tuner configured to receive a broadcast signal, an audio output interface configured to output an audio signal, an input/output interface configured to receive content from an external device, and a storing device. The display apparatus 100 may a camera, a microphone, and so forth. The communication interface 120 may further include a wireless communication module for wireless communication in addition to the RF module 121 and the IR module 123.

Figure 20:
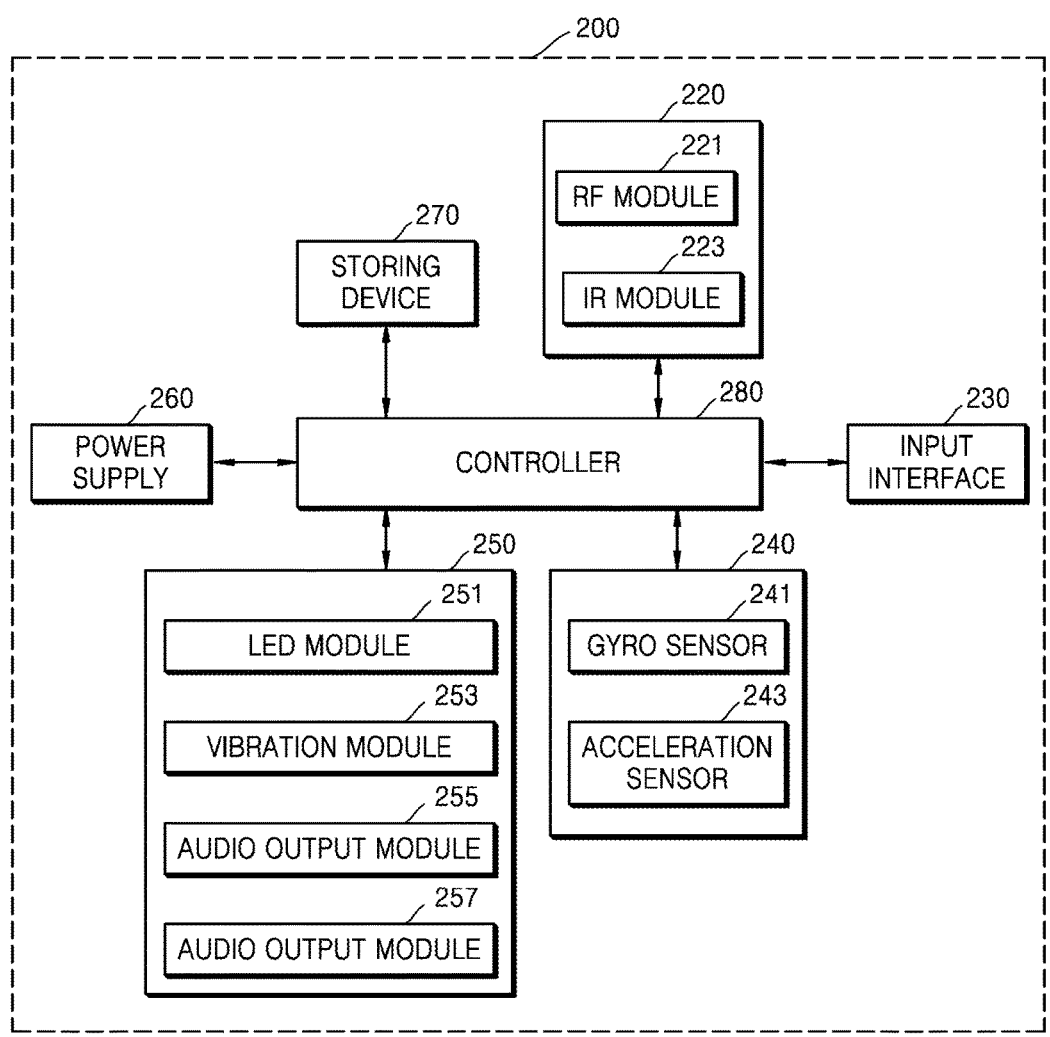
FIG. 20 is another block diagram illustrating the example control apparatus illustrated in FIG. 3.

FIG. 20 is another block diagram illustrating the example control apparatus illustrated in FIG. 3. The control apparatus 200 illustrated in FIG. 20 may correspond to the control apparatus 300 as well as the control apparatus 200 in the foregoing drawings.

Referring to FIG. 20, the control apparatus 200 may include the communication interface (e.g., including communication circuitry) 220, the input interface (e.g., including input circuitry) 230, the sensor 240, an output interface (e.g., including output circuitry) 250, a power supply 260, a storing device (e.g., including a storage/memory) 270, and a controller 280.

The communication interface 220 includes circuitry that transmits a signal to and receives a signal from the above-described display apparatus 100 according to the above-described embodiments. The communication interface 220 may include the RF module 221 including circuitry capable of transmitting and receiving a signal according to the RF communication standards. The communication interface 200 may include the IR module including circuitry capable of transmitting a signal to and receiving a signal from the display apparatus 100 according to the IR communication standards.

The input interface 230 may include input circuitry, such as, for example, and without limitation, a keypad, buttons, a touch pad, or a touch screen. The user inputs a command related to the display apparatus 100 to the control apparatus 200 by manipulating the input interface 230. If the input interface 230 includes a hard key button, the user inputs a command related to the display apparatus 100 to the control apparatus 200 by pushing the hard key button. If the input interface 230 includes a touch screen, the user inputs a command related to the display apparatus 100 to the control apparatus 200 by touching a soft key of the touch screen.

The input interface 230 may include various types of input circuitry such as, for example, a scroll key, a jog key, and so forth the user may manipulate.

The input interface 230 may also include a touch pad. The input interface 230 according to an example embodiment may receive a user input such as a drag, a touch, or a flip through the touch pad of the control apparatus 200. Depending on a type of the received user input (e.g., a direction of an input drag command, a time at which a touch command is input, or the like), the display apparatus 100 may be controlled.

The sensor 240 may include, for example, the gyro sensor 241 or an acceleration sensor 243. The gyro sensor 241 senses motion information of the control apparatus 200. For example, the gyro sensor 241 may sense information about an operation of the control apparatus 200 based on x, y, and z axes. The acceleration sensor 243 senses information about a moving speed of the control apparatus 200. Meanwhile, the sensor 240 may further include a distance measuring sensor through which a distance to the display apparatus 100 may be sensed.

The output interface 250 includes output circuitry that outputs an image or voice signal corresponding to manipulation of the user input interface 230 or a signal received by the display apparatus 100. Through the output interface 250, the user may recognize whether the user input interface 230 is manipulated or the display apparatus 100 is controlled.

For example, the output interface 250 may include various output circuitry, such as, for example, and without limitation, an LED module 251 that is lighted on or off if the user input interface 230 is manipulated or a signal is transmitted to or received from the display apparatus 100 through the communication interface 220, a vibration module 253 configured to generate vibration, an audio output module 255 configured to output audio, or a display module 257 configured to output an image.

The power supply 260 supplies power to the control apparatus 200. The power supply 260 stops power supply if the control apparatus 200 does not move during a specific time, thereby preventing the waste of the power. The power supply 260 resumes power supply if a specific key included in the control apparatus 200 is manipulated.

The storing device 270 includes a storage/memory that may further store various types of programs necessary for control or operations of the control apparatus 200, application data, and so forth.

The controller 280 controls overall matters related to control of the control apparatus 200. The controller 280 transmits a signal corresponding to manipulation of a specific key of the user input interface 230 or motion information of the control apparatus 200 sensed by the sensor 240 to the display apparatus 100 through the communication interface 220.

The controller 280 causes the RF module 221 to transmit motion information of the control apparatus 200 sensed by the gyro sensor 241 to the display apparatus 100 by controlling the gryo sensor 241 and the RF module 221.

If the command related to the display apparatus 100 is input through the user input interface 230, the controller 280 controls the communication interface 220 to cause the communication interface 220 to send a command to the display apparatus.

The control apparatus 200 sends some control signals through the IR module 221 and other control signals through the RF module 223. For example, the control apparatus 200 may send a power on/off command to the display apparatus 100 through the IR module 223 and other control signals to the display apparatus 100 through the RF module 221. Such an example of the control apparatus 200 may include a BT remote controller.

Alternatively, the control apparatus 200 may also send any control signal to the display apparatus 100 through the IR module 223. The control apparatus 200 may transmit only motion information of the control apparatus 200 to the display apparatus 100 through the IR module 221. Such an example of the control apparatus 200 may include an IR remote controller.

Meanwhile, the foregoing example embodiments may be written as programs executable on computers, and may be implemented on general-purpose digital computers operating the programs by using computer-readable recording medium.

The computer-readable recording medium may include storage medium such as magnetic storage medium (e.g., read only memory (ROM), floppy disks, hard disks, etc.), optical recording medium (e.g., compact disk (CD)-ROMs, digital versatile disks (DVDs), etc.), and carrier waves (e.g., transmission over the Internet).

It should be understood that example embodiments described herein should be considered in a descriptive sense only and not for purposes of limitation. Descriptions of features or aspects within each example embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A display apparatus comprising:
  a display comprising a touch panel;
  a radio frequency (RF) module comprising radio frequency circuitry configured to receive motion information of an external control apparatus from the external control apparatus, the motion information for controlling the display apparatus;
  an infrared (IR) module comprising infrared circuitry configured to receive a control signal from the external control apparatus; and
  a controller configured to activate the IR module and deactivate the touch panel, if a motion of the external control apparatus is greater than a reference value based on the motion information received from the external control apparatus.

2. The display apparatus of claim 1, wherein the controller is further configured to deactivate the IR module and to activate the touch panel, if no motion of the external control apparatus is greater than the reference value based on the motion information.

3. The display apparatus of claim 1, wherein the controller is further configured to deactivate the IR module and to activate the touch panel, if no motion of the external control apparatus is greater than the reference value during a first time after a motion of the external control apparatus is detected to be greater than the reference value.

4. The display apparatus of claim 1, further comprising a power supply,
  wherein the controller is further configured to block power supplied from the power supply to the touch panel, if the touch panel is deactivated.

5. The display apparatus of claim 2, wherein the controller is further configured to switch the touch panel to a suspend mode, if the touch panel does not receive a touch input during a second time period after the touch panel is activated.

6. The display apparatus of claim 5, wherein the controller is further configured to activate the touch panel, if the touch panel receives a touch input after the touch panel switches to the suspend mode.

7. The display apparatus of claim 1, wherein the controller is further configured to determine whether or not an energy saving mode is set and to selectively activate one of the touch panel and the IR module based on motion information of the external control apparatus if the energy saving mode is set.

8. The display apparatus of claim 1, wherein the control signal received by the IR module comprises a power on/off command, and the RF module is further configured to receive a second control signal, which is a control signal other than the power on/off command, from the control apparatus.

9. The display apparatus of claim 8, wherein the controller is further configured to control the display based on at least one of the power on/off command received by the IR module and the second control signal received by the RF module if the controller activates the IR module and deactivates the touch panel, and
  the controller is further configured to control the display based on at least one of a touch input received via the touch panel and the second control signal received by the RF module if the controller deactivates the IR module and activates the touch panel.

10. A method of operating a display apparatus comprising a touch panel, a radio frequency (RF) module comprising radio frequency circuitry, and an infrared (IR) module comprising infrared circuitry, the method comprising:
  receiving motion information of an external control apparatus from the external control apparatus through the RF module, the motion information for controlling the display apparatus; and
  activating the IR module and deactivating the touch panel, if a motion of the external control apparatus is greater than a reference value based on the motion information received from the external control apparatus.

11. The method of claim 10, further comprising deactivating the IR module and activating the touch panel, if no motion of the external control apparatus is greater than a reference value based on the motion information.

12. The method of claim 10, further comprising deactivating the IR module and activating the touch panel, if no motion of the external control apparatus is greater than the reference value during a first time after a motion of the external control apparatus is detected to be greater than the reference value.

13. The method of claim 10, wherein the display apparatus further comprises a power supply, and
  the method further comprises blocking power supplied from the power supply to the touch panel, if the touch panel is deactivated.

14. The method of claim 11, further comprising switching the touch panel to a suspend mode, if the touch panel does not receive a touch input during a second time period after the touch panel is activated.

15. The method of claim 14, further comprising activating the touch panel, if the touch panel receives a touch input after the touch panel switches to the suspend mode.

16. The method of claim 10, further comprising:
  determining whether an energy saving mode is set; and
  selectively activating one of the touch panel and the IR module based on the motion information if the energy saving mode is set.

17. The method of claim 10, further comprising controlling an operation of the display apparatus based on at least one of a power on/off command received by the IR module and a second control signal, which is a control signal other than the power on/off command, received by the RF module if activating the IR module and deactivating the touch panel, and
  controlling an operation of the display based on at least one of a touch input received via the touch panel and the second control signal received by the RF module if deactivating the IR module and activating the touch panel.

18. A non-transitory computer-readable recording medium having recorded thereon a program for implementing the method of claim 10.

* * * * *